(12) United States Patent
Zhou et al.

(10) Patent No.: US 9,493,235 B2
(45) Date of Patent: Nov. 15, 2016

(54) AMPHIBIOUS VERTICAL TAKEOFF AND LANDING UNMANNED DEVICE

(71) Applicants: Dylan T X Zhou, Tiburon, CA (US);
Andrew H B Zhou, Tiburon, CA (US);
Tiger T G Zhou, Tiburon, CA (US)

(72) Inventors: Dylan T X Zhou, Tiburon, CA (US);
Andrew H B Zhou, Tiburon, CA (US);
Tiger T G Zhou, Tiburon, CA (US)

( * ) Notice: Subject to any disclaimer, the term of this patent is extended or adjusted under 35 U.S.C. 154(b) by 0 days.

(21) Appl. No.: 14/940,379

(22) Filed: Nov. 13, 2015

(65) Prior Publication Data

US 2016/0114887 A1  Apr. 28, 2016

Related U.S. Application Data

(63) Continuation-in-part of application No. 13/875,311, filed on May 2, 2013, now abandoned, and a
(Continued)

(51) Int. Cl.
*B64C 35/00* (2006.01)
*B60F 5/02* (2006.01)
(Continued)

(52) U.S. Cl.
CPC .......... *B64C 35/008* (2013.01); *B60F 3/0007* (2013.01); *B60F 3/0061* (2013.01); *B60F 5/02* (2013.01); *B63G 8/001* (2013.01); *B63G 8/16* (2013.01); *B64C 29/0033* (2013.01); *B64C 39/024* (2013.01); *G01S 19/39* (2013.01); *G05D 1/0088* (2013.01); *G05D 1/042* (2013.01); *G05D 1/048* (2013.01); *G06Q 20/3274* (2013.01);
(Continued)

(58) Field of Classification Search
CPC .......... B64C 29/0033; B64C 35/00; B64C 35/008; B64C 2201/088; B60F 3/0061; B60F 5/02
See application file for complete search history.

(56) References Cited

U.S. PATENT DOCUMENTS 2,989,269 A * 6/1961 Le Bel ............... B64C 29/0033
114/289
3,029,042 A * 4/1962 Martin ..................... B60F 3/00
180/119
(Continued)

*Primary Examiner* — Joseph W Sanderson
(74) *Attorney, Agent, or Firm* — Georgiy L. Khayet

(57) ABSTRACT

An amphibious vertical takeoff and landing (VTOL) unmanned device includes a modular and expandable waterproof body. An outer body shell, at least one wing, and a door are connected to the modular and expandable waterproof body. A propulsion system of the amphibious VTOL unmanned device includes a plurality of motors and propellers and a propeller protection system. The amphibious VTOL unmanned device further includes a battery, a charging station for batteries, an onboard electricity generator a power distribution board, an electrical power storage device, and an electrical machine electrically connected to the electrical power storage device. The amphibious VTOL unmanned device is further equipped with a landing system, an onboard air compressor, an onboard electrolysis system, a cooling device, vision aiding and orientative lights, an apparatus for internally housing a cargo, and a manually or automatically deployable parachute.

15 Claims, 22 Drawing Sheets

Related U.S. Application Data continuation-in-part of application No. 13/620,775, filed on Sep. 15, 2012, now abandoned, and a continuation-in-part of application No. 13/661,207, filed on Oct. 26, 2012, now abandoned, and a continuation-in-part of application No. 13/760,214, filed on Feb. 6, 2013, now Pat. No. 9,016,565, and a continuation-in-part of application No. 13/973,146, filed on Aug. 22, 2013, now Pat. No. 9,153,074, and a continuation-in-part of application No. 13/646,706, filed on Oct. 7, 2012, and a continuation-in-part of application No. 13/287,279, filed on Nov. 2, 2011, now abandoned, and a continuation-in-part of application No. 13/185,491, filed on Jul. 18, 2011, now Pat. No. 9,367,841, and a continuation-in-part of application No. 14/165,826, filed on Jan. 28, 2014, now abandoned, and a continuation-in-part of application No. 14/285,659, filed on May 23, 2014, now abandoned, and a continuation-in-part of application No. 14/458,791, filed on Aug. 13, 2014, now Pat. No. 9,098,190, and a continuation-in-part of application No. 14/695,256, filed on Apr. 24, 2015, now Pat. No. 9,100,493, and a continuation-in-part of application No. 14/815,988, filed on Aug. 1, 2015, now Pat. No. 9,342,829, which is a continuation-in-part of application No. 12/749,412, filed on Mar. 29, 2010, now abandoned, and a continuation-in-part of application No. 14/034,509, filed on Sep. 23, 2013, application No. 14/940,379, which is a continuation-in-part of application No. 14/817,341, filed on Aug. 4, 2015, now Pat. No. 9,208,505, said application No. 14/034,509 is a continuation-in-part of application No. 10/677,098, filed on Sep. 30, 2003, now Pat. No. 7,702,739.

(60) Provisional application No. 60/415,546, filed on Oct. 1, 2002.

(51) Int. Cl.
| | | |
|---|---|---|
| B64C 29/00 | (2006.01) | |
| B64C 39/02 | (2006.01) | |
| G05D 1/04 | (2006.01) | |
| B60F 3/00 | (2006.01) | |
| G05D 1/00 | (2006.01) | |
| B63G 8/00 | (2006.01) | |
| G01S 19/39 | (2010.01) | |
| G08G 3/02 | (2006.01) | |
| G08G 5/04 | (2006.01) | |
| H04N 7/18 | (2006.01) | |
| H04N 5/232 | (2006.01) | |
| H04N 5/265 | (2006.01) | |
| B63G 8/16 | (2006.01) | |
| G06Q 20/32 | (2012.01) | |
| G06Q 20/36 | (2012.01) | |

(52) U.S. Cl.
CPC ............ *G06Q 20/367* (2013.01); *G08G 3/02* (2013.01); *G08G 5/045* (2013.01); *H04N 5/23238* (2013.01); *H04N 5/265* (2013.01); *H04N 7/181* (2013.01); *B63G 2008/004* (2013.01); *B64C 2201/021* (2013.01); *B64C 2201/024* (2013.01); *B64C 2201/042* (2013.01); *B64C 2201/066* (2013.01); *B64C 2201/102* (2013.01); *B64C 2201/108* (2013.01); *B64C 2201/127* (2013.01); *B64C 2201/141* (2013.01); *B64C 2201/162* (2013.01); *B64C 2201/165* (2013.01)

(56) References Cited

U.S. PATENT DOCUMENTS

| | | | | |
|---|---|---|---|---|
| 4,579,297 | A * | 4/1986 | Ayoola | B60F 3/00 244/106 |
| 5,645,250 | A * | 7/1997 | Gevers | B64C 1/00 244/101 |
| 6,138,943 | A * | 10/2000 | Huang | B60F 5/02 244/17.25 |
| 7,472,863 | B2 * | 1/2009 | Pak | A63H 27/14 244/12.5 |
| 7,874,513 | B1 * | 1/2011 | Smith | B64C 29/0033 244/12.4 |
| 7,959,104 | B2 * | 6/2011 | Kuntz | A63H 17/00 244/2 |
| 8,827,200 | B2 * | 9/2014 | Radu | B60F 5/02 244/2 |
| 9,045,226 | B2 * | 6/2015 | Piasecki | G05D 1/102 |
| 9,085,355 | B2 * | 7/2015 | DeLorean | B64C 29/0033 |
| 2002/0125367 | A1 * | 9/2002 | Killingsworth | B60F 3/00 244/17.11 |
| 2002/0195518 | A1 * | 12/2002 | Killingsworth | B60F 3/00 244/7 A |
| 2005/0236520 | A1 * | 10/2005 | Wukowitz | B64C 5/02 244/105 |
| 2006/0016930 | A1 * | 1/2006 | Pak | A63H 27/14 244/12.4 |
| 2008/0048065 | A1 * | 2/2008 | Kuntz | A63H 17/00 244/17.23 |
| 2010/0181414 | A1 * | 7/2010 | Lopez, Jr. | B64C 29/0033 244/12.4 |
| 2011/0042507 | A1 * | 2/2011 | Seiford, Sr. | B60F 5/02 244/2 |
| 2011/0315806 | A1 * | 12/2011 | Piasecki | G05D 1/102 244/2 |
| 2013/0026303 | A1 * | 1/2013 | Wang | B64C 3/54 244/7 R |
| 2013/0026304 | A1 * | 1/2013 | Wang | B64C 29/0033 244/7 R |
| 2013/0068876 | A1 * | 3/2013 | Radu | B60F 5/02 244/2 |
| 2014/0158816 | A1 * | 6/2014 | DeLorean | B64C 29/0033 244/12.4 |

* cited by examiner

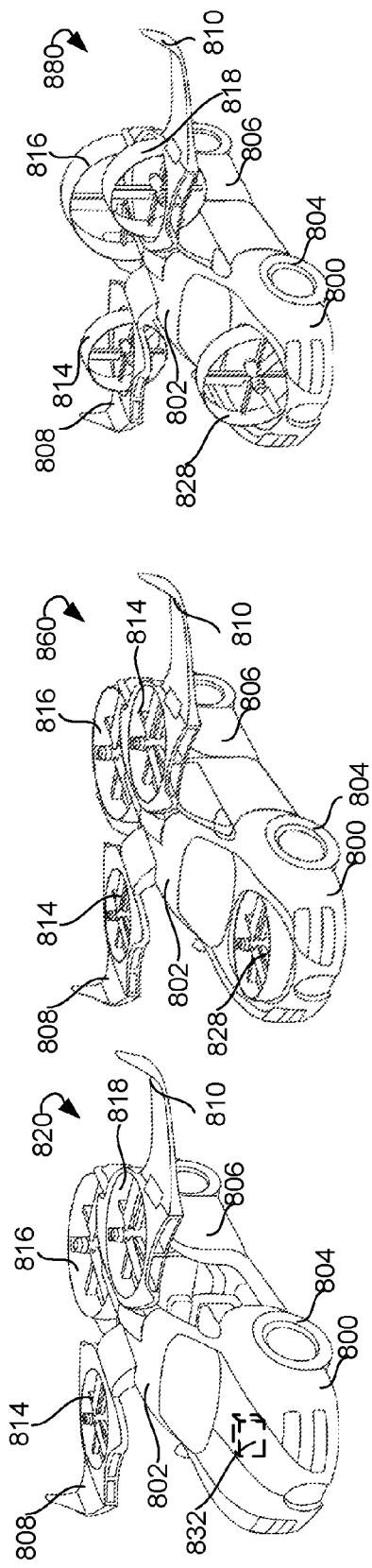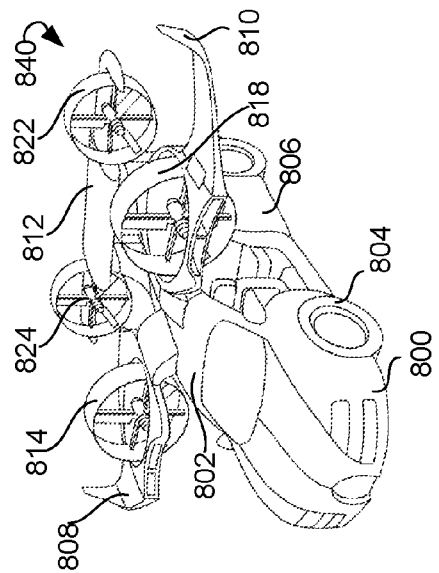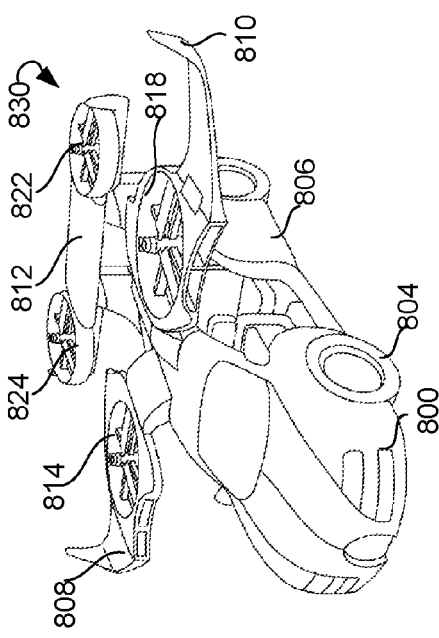

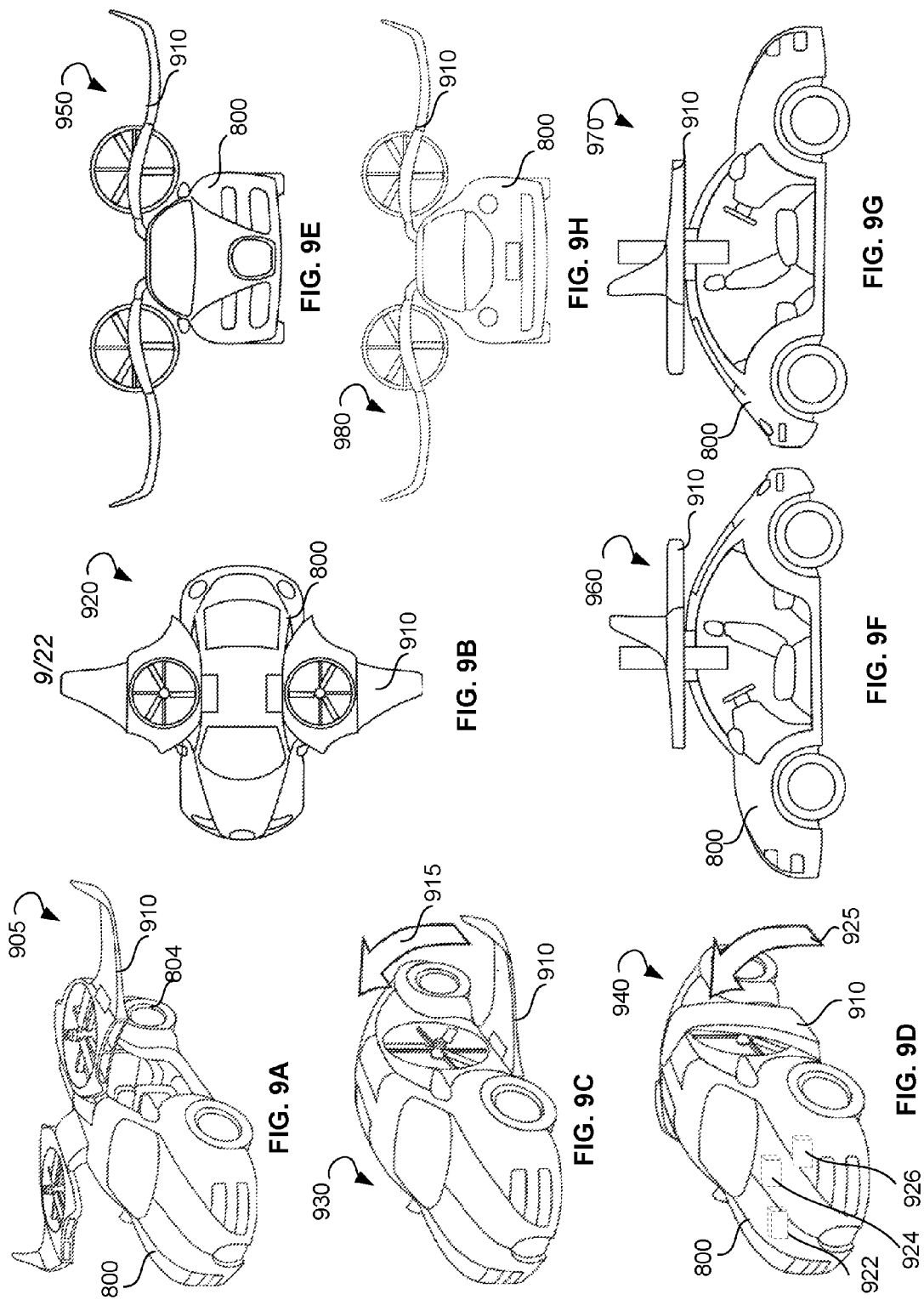

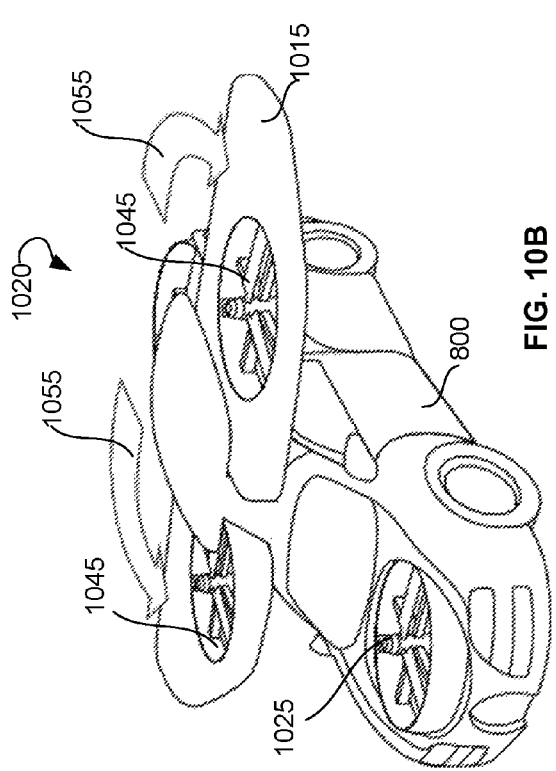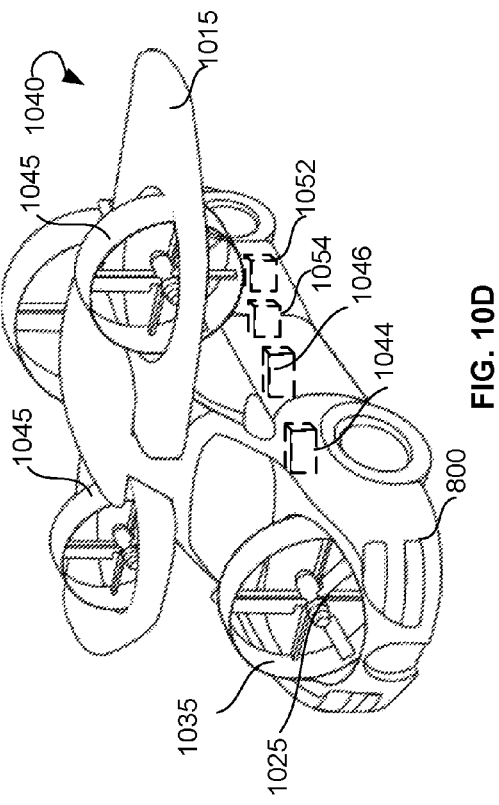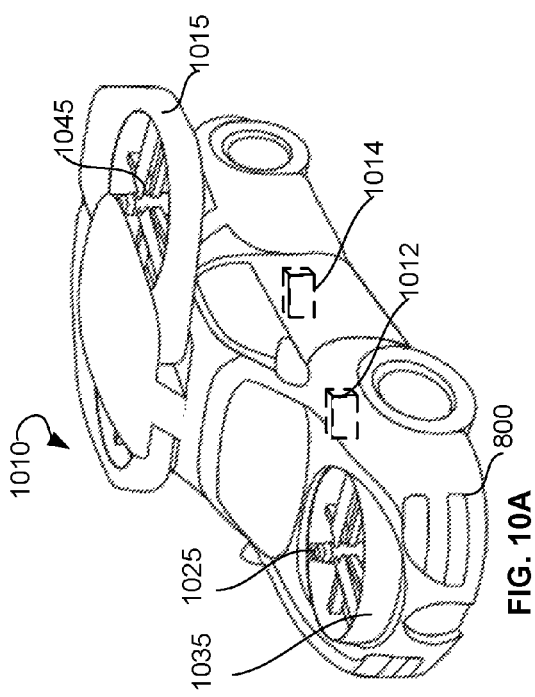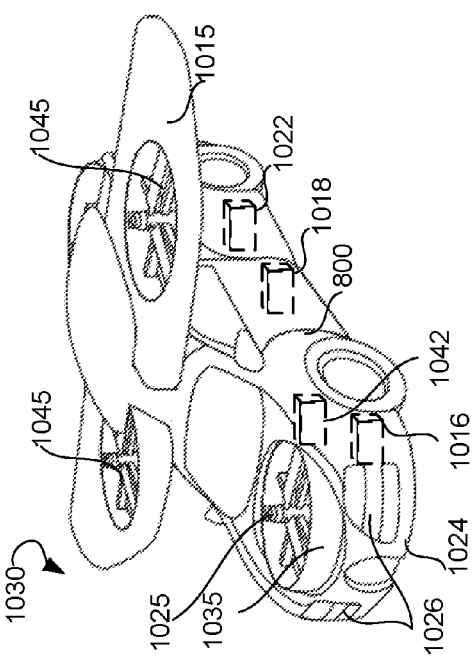

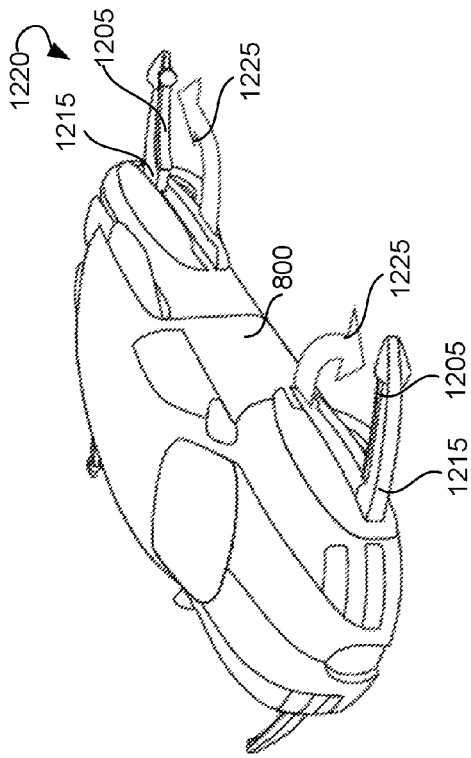
FIG. 12A
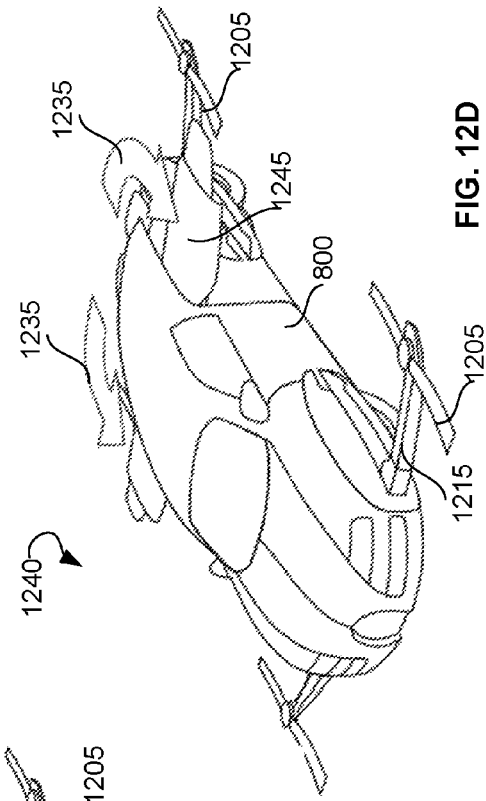
FIG. 12B
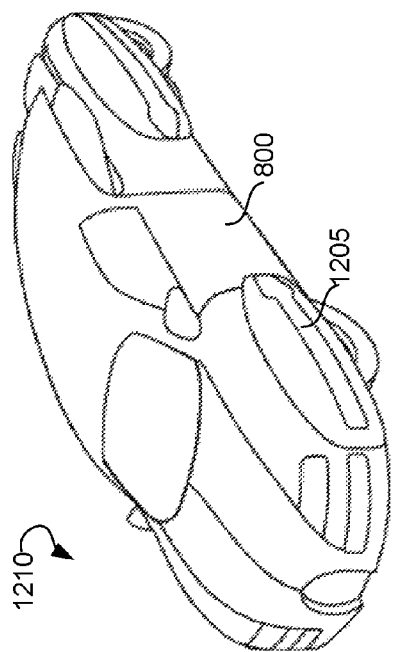
FIG. 12C
FIG. 12D

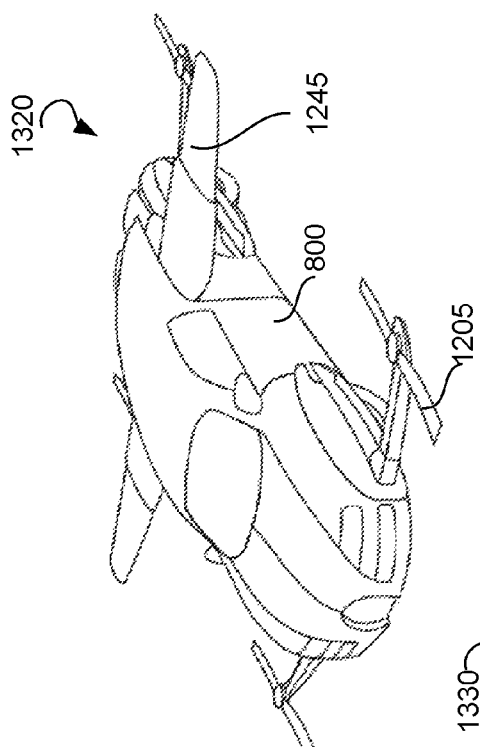
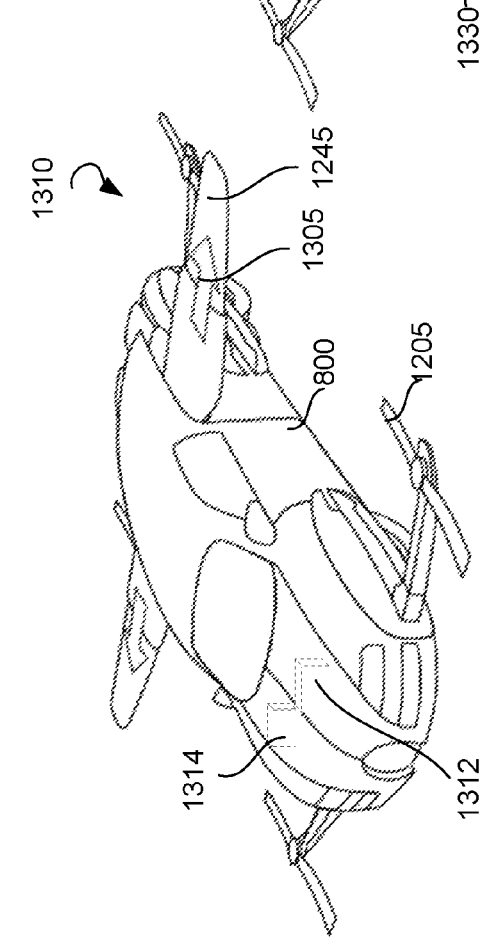
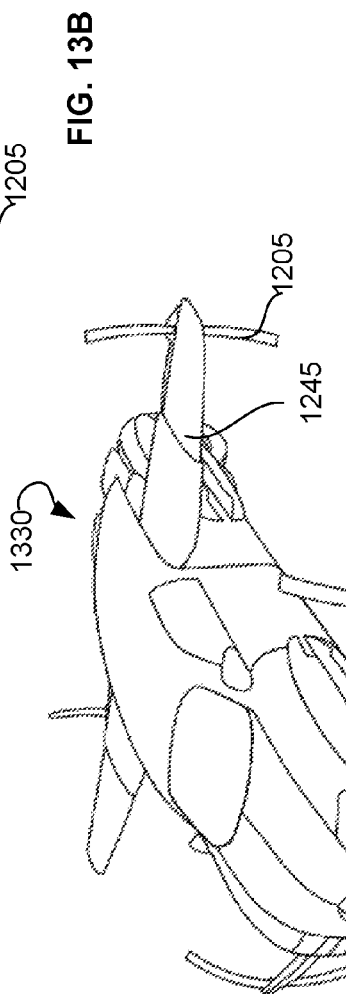
FIG. 13A
FIG. 13B
FIG. 13C

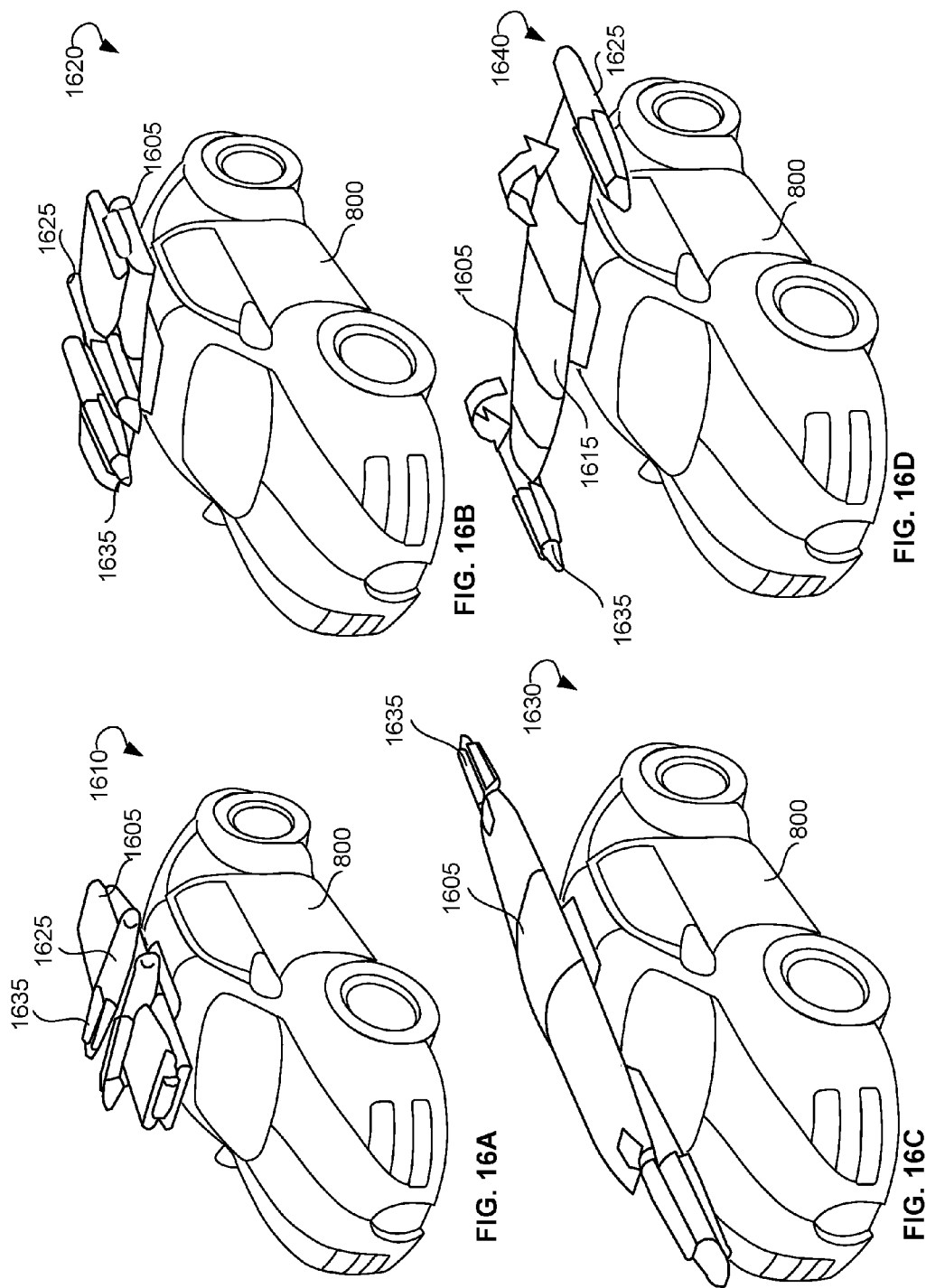

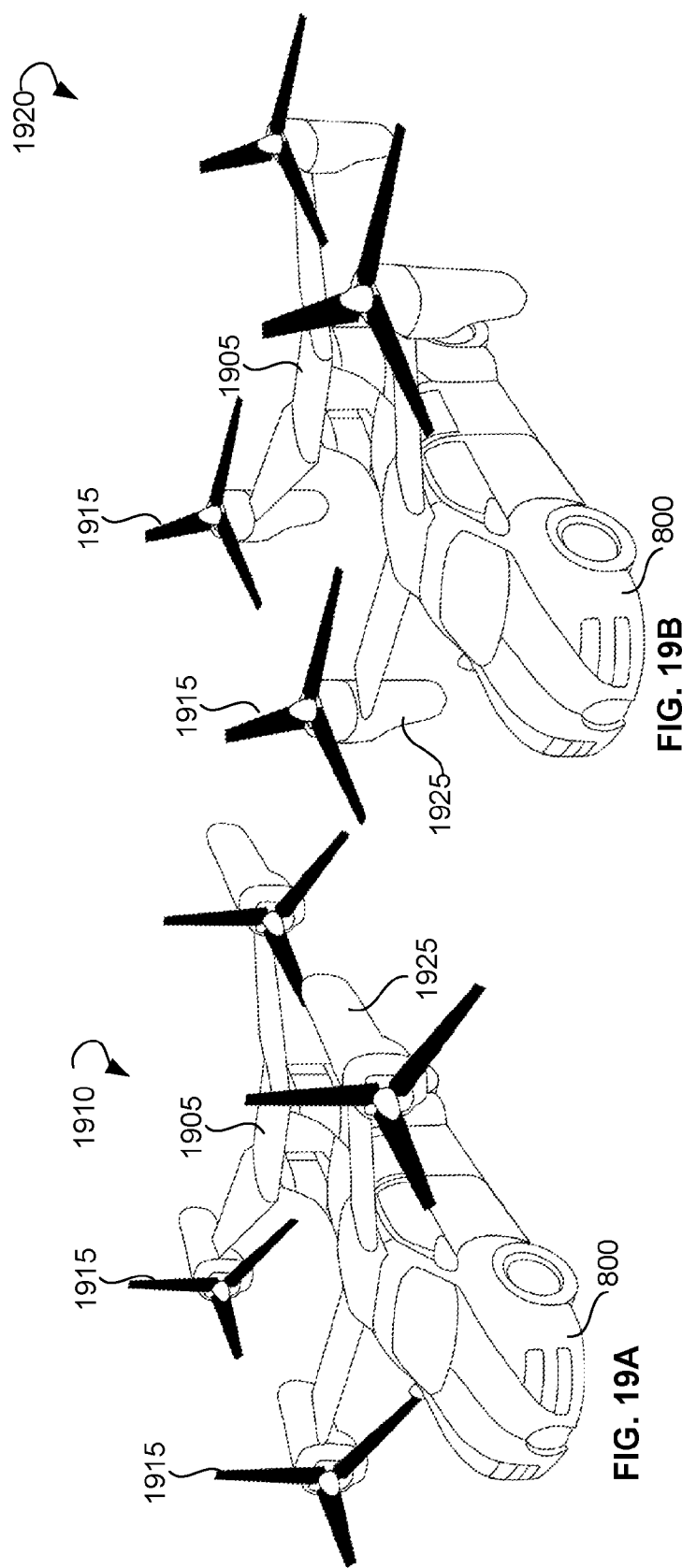

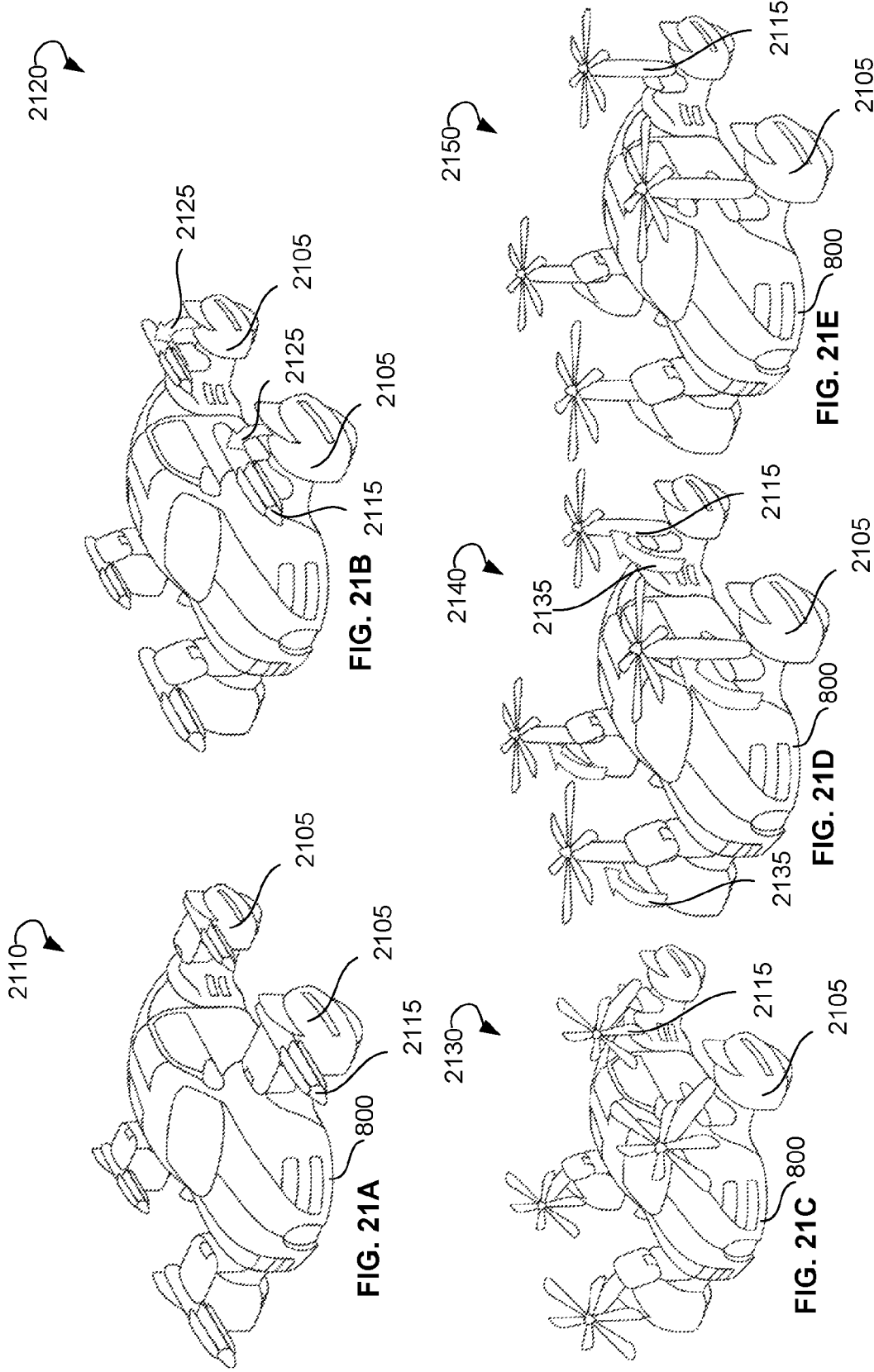

AMPHIBIOUS VERTICAL TAKEOFF AND LANDING UNMANNED DEVICE

CROSS-REFERENCE TO RELATED APPLICATIONS

This application is a continuation-in-part of U.S. patent application Ser. No. 13/875,311, entitled "FACILITATING MOBILE DEVICE PAYMENTS USING MOBILE PAYMENT ACCOUNT, MOBILE BARCODE AND UNIVERSAL DIGITAL MOBILE CURRENCY," filed on May 2, 2013, U.S. patent application Ser. No. 13/620,775, entitled "METHODS AND SYSTEMS FOR FACILITATING MOBILE DEVICE PAYMENTS USING CODES AND CASHBACK BUSINESS MODEL," filed on Sep. 15, 2012, U.S. patent application Ser. No. 13/661,207, entitled "METHODS AND SYSTEMS FOR RECEIVING COMPENSATION FOR USING MOBILE PAYMENT SERVICES," filed on Oct. 26, 2012, U.S. patent application Ser. No. 13/760,214, entitled "WEARABLE PERSONAL DIGITAL DEVICE FOR FACILITATING MOBILE DEVICE PAYMENTS AND PERSONAL USE," filed on Feb. 6, 2013, U.S. patent application Ser. No. 13/973,146, entitled "WEARABLE AUGMENTED REALITY EYEGLASS COMMUNICATION DEVICE INCLUDING MOBILE PHONE AND MOBILE COMPUTING VIA VIRTUAL TOUCH SCREEN GESTURE CONTROL AND NEURON COMMAND," filed on Aug. 22, 2013, U.S. patent application Ser. No. 13/646,706, entitled "METHODS AND SYSTEMS FOR PREVENTING CARD PAYMENT FRAUD AND RECEIVING PAYMENTS USING CODES AND MOBILE DEVICES," filed on Jul. 18, 2011, U.S. patent application Ser. No. 13/287,279, entitled "METHODS AND SYSTEMS TO ADVERTISE AND SELL PRODUCTS OR SERVICES VIA CLOUD GAMING ENVIRONMENTS," filed on Nov. 2, 2011, and U.S. patent application Ser. No. 13/185,491, entitled "FACILITATING MOBILE DEVICE PAYMENTS USING PRODUCT CODE SCANNING," filed on Jul. 18, 2011, U.S. patent application Ser. No. 14/165,826, entitled "SYSTEMS AND METHODS TO OWN A FREE COMPUTER, A FREE MOBILE DEVICE AND A FREE WEARABLE DEVICE AND LIFE TIME WARRANTY VIA THE SAME DEVICE PAYMENT CASHBACK," filed on Jan. 28, 2014, U.S. patent application Ser. No. 14/285,659, entitled "UNMANNED DRONE, ROBOT SYSTEM FOR DELIVERING MAIL, GOODS, HUMANOID SECURITY, CRISIS NEGOTIATION, MOBILE PAYMENTS, SMART HUMANOID MAILBOX AND WEARABLE PERSONAL EXOSKELETON HEAVY LOAD FLYING MACHINE", filed on May 23, 2014, U.S. patent application Ser. No. 14/458,791, entitled "SYSTEMS AND METHODS FOR MESSAGING, CALLING, DIGITAL MULTIMEDIA CAPTURE AND PAYMENT TRANSACTIONS", filed on Aug. 13, 2014, U.S. patent application Ser. No. 14/695,256, entitled "WEARABLE PERSONAL DIGITAL DEVICE FOR FACILITATING MOBILE DEVICE PAYMENTS AND PERSONAL USE", filed on Apr. 24, 2015, U.S. patent application Ser. No. 14/815,988, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Aug. 1, 2015, which claims priority to U.S. patent application Ser. No. 12/749,412, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Mar. 29, 2010, U.S. patent application Ser. No. 14/034,509, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 23, 2013, U.S. patent application Ser. No. 14/817,341, entitled "SYSTEMS AND METHODS FOR PROVIDING COMPENSATION, REBATE, CASHBACK, AND REWARD FOR USING MOBILE AND WEARABLE PAYMENT SERVICES", filed on Aug. 4, 2015, and U.S. patent application Ser. No. 10/677,098, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 30, 2003, which claims priority to U.S. Provisional Patent Application No. 60/415,546, entitled "DATA PROCESSING SYSTEM", filed on Oct. 1, 2002, which are incorporated herein by reference in their entirety.

FIELD

This application relates generally to unmanned systems and, more specifically, to tilt wing, tilt fuselage, and tilt rotor systems capable of navigating underwater and in the air with mobile application and wearable application.

BACKGROUND

Conventional unmanned fixed rotor aerial vehicles belong to one of two categories: multi rotor or plane. A fixed rotor multi rotor generates lift by propelling air below itself, thereby eliminating the need for a runway or launching mechanism to take off. Fixed rotor multi rotors move in the X and Y axis by variable thrust, and yaw on the Z axis by counter rotating torque. When accelerating in the Y axis, multi copter operators find their field of view dominated by the ground, because the onboard cameras for first person view point downwards when the multi copter pitches forwards by variable thrust. Traditional multi-copters do not have control surfaces to change direction, thus simplifying design. Multi copters can move by these methods because their rotors produce downwards thrust to hover at the expense of speed and efficiency which are characteristic of the second fixed rotor category, the plane.

Traditionally, planes produce thrust in the horizontal axis and use wings to generate lift. As a result, conventional planes require a runway or launching mechanism to launch. Once airborne, planes expend significantly less energy on staying airborne, whereas a multi rotor loses a constant stream of energy to maintain altitude. Planes navigate the airspace by using control surfaces to redirect airflow around their wings, thus changing the vehicle's course of direction.

Given a multi rotor's limitation to singularly produce vertical thrust, a vehicle of multi rotor design cannot efficiently maneuver underwater, where horizontal thrust vectoring is required for locomotion. A plane may be unsuitable, because its large wings can cause turbulence in rougher waters.

Traditional remotely operated underwater vehicles receive control inputs via a wired tether that can be caught on obstacles. Traditional ROVs rely on their large mass to keep from being moved by heavy currents, making them hard to transport.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided is an amphibious vertical takeoff and landing (VTOL) unmanned device. The amphibious VTOL unmanned device may include a modular and expandable waterproof body, a chassis, an outer body shell comprising one or more pieces, and a propulsion system selected from a coaxial propulsion system and a single-rotor propulsion system. The propulsion system may comprise a plurality of motors and propellers associated with the plurality of motors. The propellers may be selected from clockwise propellers, counterclockwise propellers, and variable pitch propellers. The amphibious VTOL unmanned device may further include a propeller protection system, a surface skidding material platform, a landing system that conforms to a landing surface, one or more control surfaces selected from a group comprising: a rudder, an aileron, a flap, and an elevator, a ballast selected from a permanently fixed ballast and a detachable ballast, an onboard air compressor, an onboard electrolysis system, at least one waterproof through-body wire or antenna feed-through, a tilt-motor device, a tilt fuselage device, and a tilt wing device, a battery. A shape of the battery may conform to an interior profile of the modular and expandable waterproof body, a power distribution board one or more of the following: a flight controller, electronic speed controllers, a buzzer, an on screen display telemetry device, a video transmitter, and a radio control receiver. The board may act as the chassis of the system. Furthermore, the amphibious VTOL unmanned device may include a Global Positioning System module, a lost model alert, a cooling device comprising at least one heat sink, fan, or duct, a detachable impact absorbing skin or shell, vision aiding and orientative lights, wherein the vision aiding and orientative lights include light emitting diodes, one or more hatches, quick connect payloads, a lap counter for racing, a flat or inclined launch platform or footing, one or more claws with at least one degree of freedom, an apparatus for internally housing a cargo, a charging station for multiple batteries, the charging station comprising a fireproof bunker, a partial vacuum device configured to perform cooling and increase buoyancy, a manually or automatically deployable parachute, and an onboard electricity generator comprising a plurality of solar cells, one or more wind turbines, and one or more hydroelectric generators.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which:

FIGS. 8A-8E show example amphibious vertical takeoff and landing unmanned devices, in accordance with some embodiments.

FIGS. 9A-9H show example amphibious vertical takeoff and landing unmanned devices, in accordance with some embodiments.

FIGS. 10A-10D show example amphibious vertical takeoff and landing unmanned devices, in accordance with some embodiments.

FIGS. 12A-12D show example amphibious vertical takeoff and landing unmanned devices, in accordance with some embodiments.

FIGS. 13A-13C show example amphibious vertical takeoff and landing unmanned devices, in accordance with some embodiments.

FIGS. 16A-16D show example amphibious vertical takeoff and landing unmanned devices, in accordance with some embodiments.

FIGS. 19A and 19B show example amphibious vertical takeoff and landing unmanned devices, in accordance with some embodiments.

FIGS. 21A-21E show example amphibious vertical takeoff and landing unmanned devices, in accordance with some embodiments.

DETAILED DESCRIPTION

Figure 1:
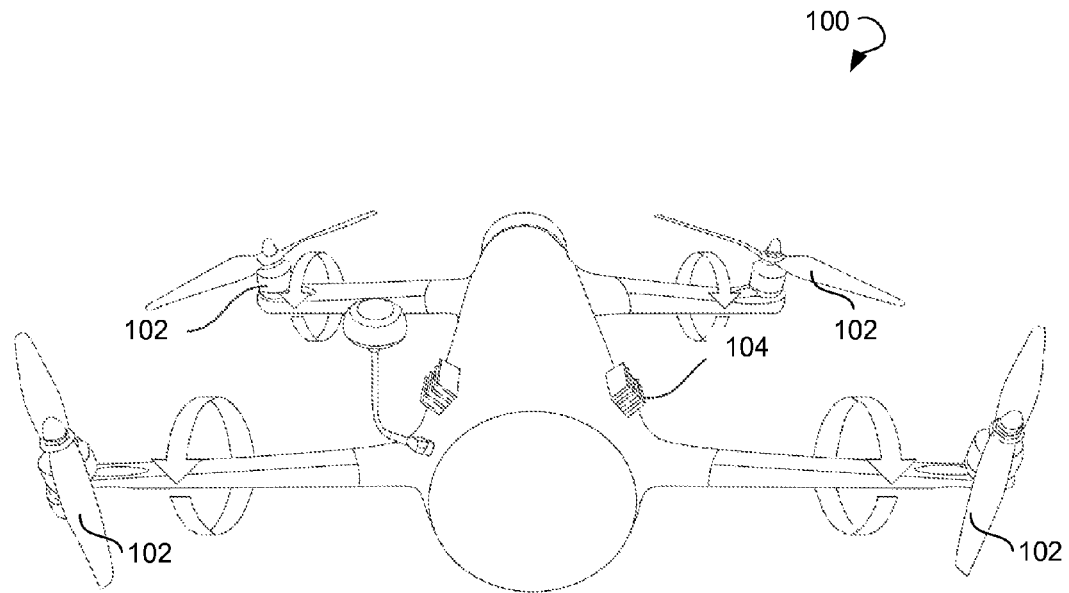
FIG. 1 illustrates an amphibious vertical takeoff and landing unmanned device, according to an example embodiment.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

An amphibious vertical takeoff and landing (VTOL) unmanned vehicle to enable wireless aerial and underwater navigation using a tilt rotor mechanism is described herein.

The vehicle may orient rotors perpendicular to a launching surface and take off vertically like a helicopter. The vehicle may further transition into a full forward flight mode by orienting the rotors into a fixed horizontal position. In another aerial setting, the vehicle may tilt the rotor in dynamic increments when the vehicle receives an input from an operator to move forwards or backwards. To move in the Y-axis, the speed of motors may remain constant, and the motors may tilt forwards or backwards as opposed to using methods involving differential thrust. The same tilt rotor locomotion techniques may be applied to the X-axis for efficient lateral motion. By tilting the motors of the vehicle to move, a body of the vehicle may stay at a predetermined level with respect to the ground or floor and all motors of the vehicle may reach a full throttle volume, thus allowing for faster speed and acceleration. The vehicle may still hover by tilting the rotors back into a vertical position.

The amphibious VTOL unmanned vehicle may load one of many downloaded flight profile parameters according to a given environmental and mechanical state. The onboard flight controller may detect automatically or by manual input whether the vehicle is airborne or submerged. If the vehicle is airborne, the flight controller may detect whether the vehicle is in a hover mode, a full forward flight, or uses a dynamic tilting rotors function. Depending on the state of the vehicle, different flight and dive control parameters may be loaded. The sets of parameters are also referred to herein as flight profiles.

In the case of a failure of the vehicle when submerged, the vehicle may have a slight positive buoyancy so that the vehicle can float to the surface. The vehicle may include a gas powered or mechanically actuated ballast to add underwater stability and maneuverability while maintaining the overall light weight of the vehicle. The vehicle may use a counter-rotating torque influenced by differential motor speed and the tilt rotor functionality to navigate underwater with fixed pitch or variable pitch propellers. The amphibious VTOL unmanned vehicle may comprise a multi-rotor propulsion system. As used herein, the terms "rotor" and "propeller" are used interchangeably. Propellers may be either directly attached to a motor shaft, or driven by a belt mechanism. The number of motors may be less than the number of propellers. The propellers may be fixed pitch propellers to reduce weight, or variable pitch propellers to optimize the vehicle for pressure changes. Furthermore, variable pitch propellers or collective pitch propellers may enable three-dimensional acrobatic maneuvers and sustained inverted flight. In the case of a tilt rotor VTOL vehicle, the rotors may be attached to the ends of a movable shaft to enable the tilt rotor functionality. In turn, the shaft may be actuated by a direct drive, a belt drive, or rigid links attached to a brushless motor or a geared motor. Access to the internal mechanisms of the vehicle may require at least one waterproof hatch. Mechanisms within the body of the vehicle may include a tilt actuator of at least one tilt axis, and an integrated modular electronics system.

Referring now to the drawings, FIG. 1 illustrates an amphibious VTOL unmanned device, according to an example embodiment. The amphibious VTOL unmanned vehicle also referred herein to as the amphibious VTOL unmanned device may be used for photography and video capturing. The amphibious VTOL unmanned device is described herein with reference to post-recording media editing services.

As shown on FIG. 1 the amphibious VTOL unmanned device 100 may be single axis or coaxial rotor system and may be propelled by a direct drive, for example when propellers 102 are directly attached to a motor shaft, or by belts and pulleys, chains and sprockets, magnets, and/or rigid links, where the propellers 102 may be indirectly linked to the motor shaft. The motors may be powered by electricity or high pressure fluid, including gas.

Figure 2:
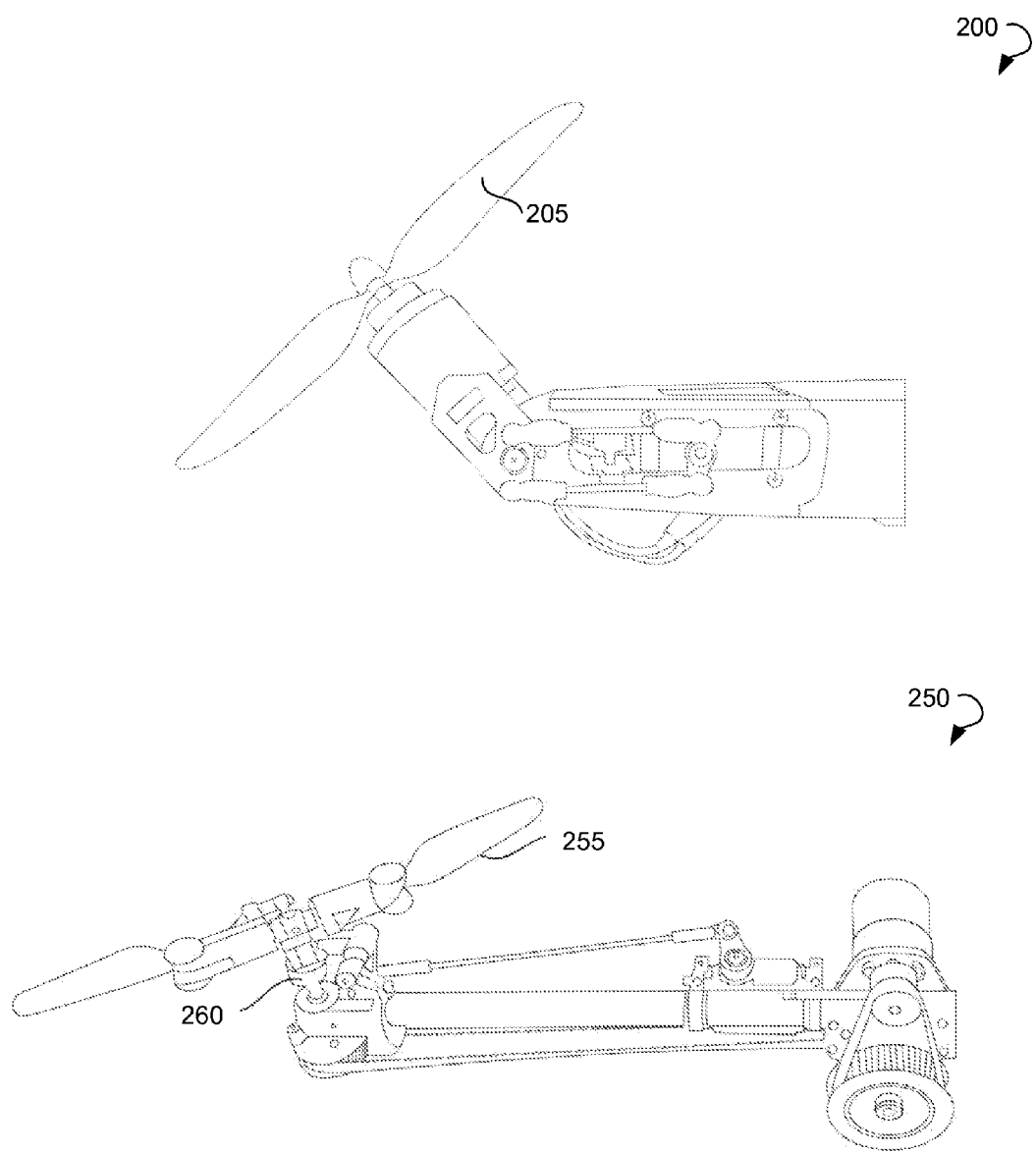
FIG. 2 illustrates a fixed pitch propeller and a variable pitch propeller, in accordance with some embodiments.
Figure 3:
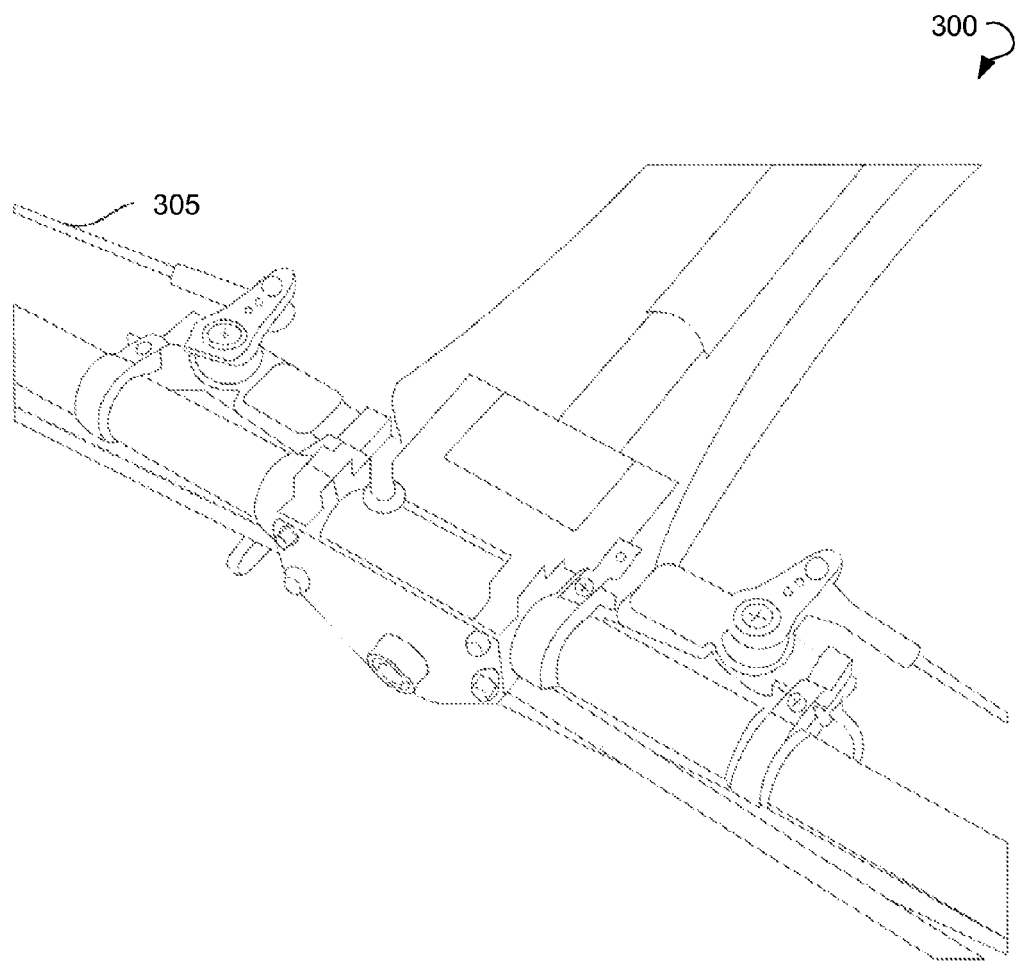
FIG. 3 illustrates a linkage for connection of servos or motors, in accordance with some embodiments.

The propellers 102 may be fixed pitch propellers or variable pitch propellers. FIG. 2 represents schematic diagrams 200 and 250 of a fixed pitch propeller 205 and a variable pitch propeller 255. The variable pitch propeller may be are actuated by servos, motors, pistons, or linear actuators which move a slider 260 axially. The servos or motors may be attached to the slider 260 directly, or by linkages. FIG. 3 shows a schematic diagram 300 of a linkage 305 for connection of the servos or motors to the slider. In further embodiments, the servos or motors may be attached to the slider 260 by frictionless magnet gears, conventional gears, chains, and/or pulleys.

Referring back to FIG. 1, a Y-axis tilt mechanism of the device 100 may require the rotors to be mounted on opposite ends of a shaft perpendicular to the center of the device 100. The shaft may be linked directly or indirectly to a motor or servo which tilts the shaft, thus tilting the rotors attached to the shaft. The X-axis tilt mechanism may require the rotors to be mounted on opposite ends of a shaft perpendicular to the center of the device 100. The shaft may be linked directly or indirectly to a motor or servo that may move a slider axially, thus enabling the variable pitch of the propellers. The Y-axis tilt mechanism may also work by employing rotor pair separately, directly or motors or servos to tilt each singular rotor or coaxial indirectly. The X-axis tilt mechanism may also work by employing motors or servos to move each singular rotor slider or coaxial rotor slider pair separately, directly or indirectly. Y- and X-axis tilt movements may be combined by implementing a ball and socket joint for each rotor or coaxial rotor pair component. Moving the rotor systems and landing gear components in the Z-axis may involve raising the rotor arms higher than the body of the device 100, or lowering the body below the rotor arms. On case of a direct motor attachment, the direct motor attachment includes the embodiment when the motor or servo are aided by a supported extension shaft. The tilting mechanisms may utilize waterproof ball bearings at the point where the body meets the tilting arms.

The amphibious VTOL device 100 may comprise a ballast to enhance stability underwater while still able to stay light in the sky. The device 100 may utilize a gas ballast system, piston ballast system, vented ballast system, pressure ballast system, compressed air ballast system, and a recirculating compressed air ballast system. The device 100 may further include a static diving systems that may utilize a filler valve, a flood valve, a blow valve, a charge valve, a pressure vessel, a vent, a vent valve, or multipurpose valve. The static diving systems may utilize at least one air pump, a water pump, an air compressor, an electrolysis machine, a piston, and/or a motor to increase or decrease the buoyancy of the device 100.

The device 100 may further include a camera stabilization device that may compensate for the wobble of the device 100 up along three axes by using separate servos to control camera pan, tilt, and roll. The servos or motors may be used for stabilization and manipulating camera direction as instructed by at least one operator. The camera positioning system may be capable of switching between positions below, above, and to the sides of the sides of the device 100 not limited to a single central axis. The device 100 may further include a photography and videography system that may utilize a mobile camera positioning system that moves the camera stabilization device or the lone camera and accessories between the top and bottom of the device 100. Camera positioning system may also include an extendable arm. The camera positioning system may move laterally, unrestricted by the central axis of the device 100.

The device 100 may further include a skid-resistant under-body material component, which may be useful in such cases as low altitude multirotor racing where the vehicle is susceptible to contact the ground for a short period of time. The under-body material component may be replaced when damaged.

Figure 4:
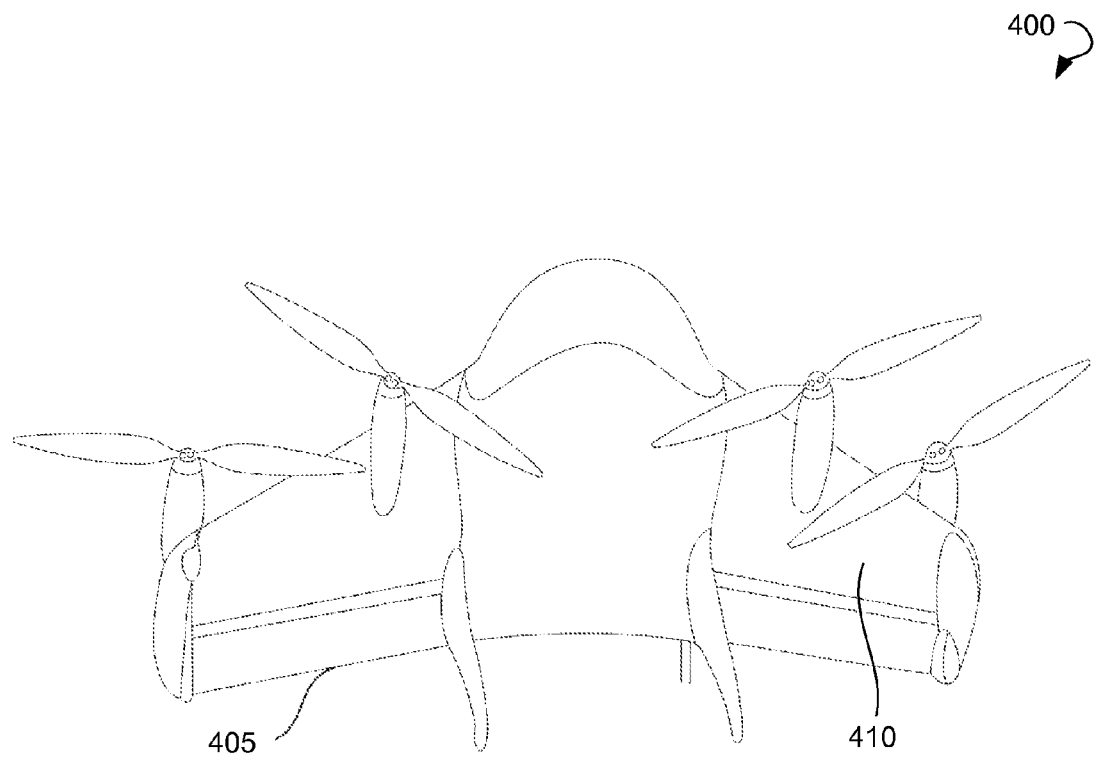
FIG. 4 illustrates an amphibious vertical takeoff and landing unmanned device, in accordance with certain embodiments.

FIG. 4 shows a schematic diagram 400 of another example embodiment of the device 100. The device 100 may include control surfaces 405. The control surfaces 405 may include an elevator, a rudder, a sail, v-tail surfaces, ailerons, tailplanes, and foreplanes to allow for sharp cornering. The device 100 may include one or many wings 410 to generate lift without needing much thrust compensation for body inclination.

Figure 5:
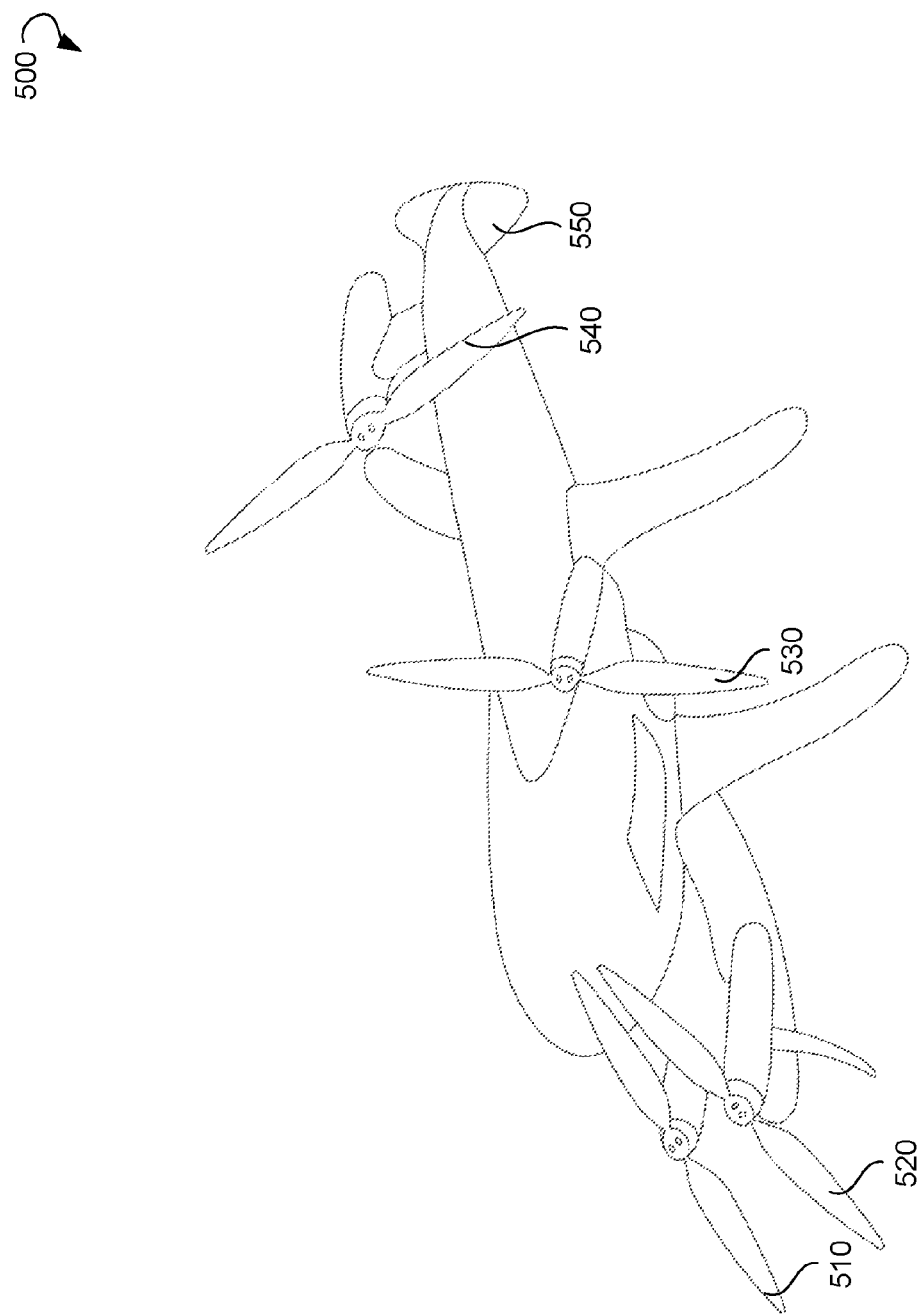
FIG. 5 shows an amphibious vertical takeoff and landing unmanned device, in accordance with some embodiments.

FIG. 5 shows a device 500 being another example embodiment of the device 100. The device 500 is a multirotor vehicle having rotors 510, 520, 530, and 540.

Figure 6:
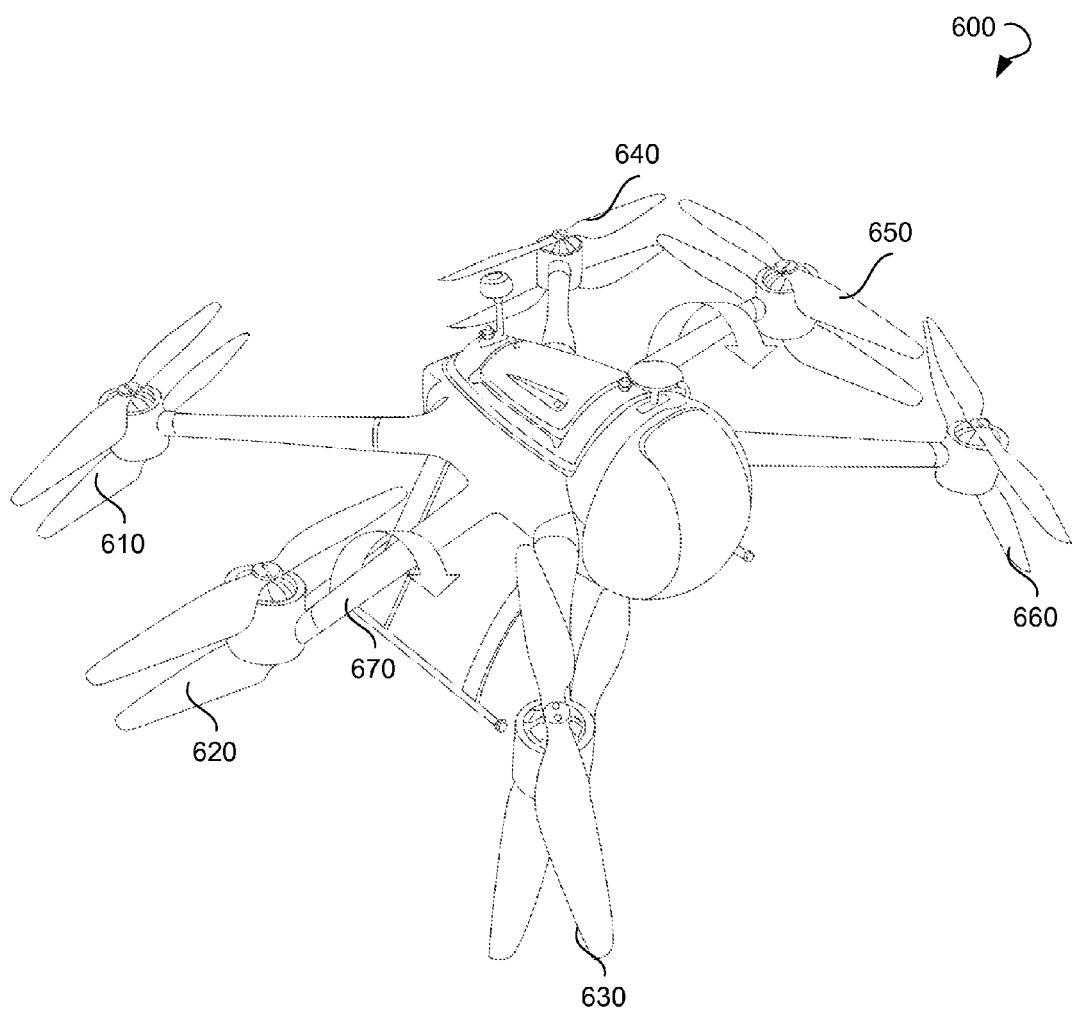
FIG. 6 shows an amphibious vertical takeoff and landing unmanned device, in accordance with some embodiments.

FIG. 6 shows a device 600 being another example embodiment of the device 100. The device 600 is a multirotor vehicle having rotors 610, 620, 630, 640, 650, and 660. The device 600 may have a two-axis tilting mechanism 670 configured to tilt each of the rotors 610, 620, 630, 640, 650, and 660.

Figure 7A:
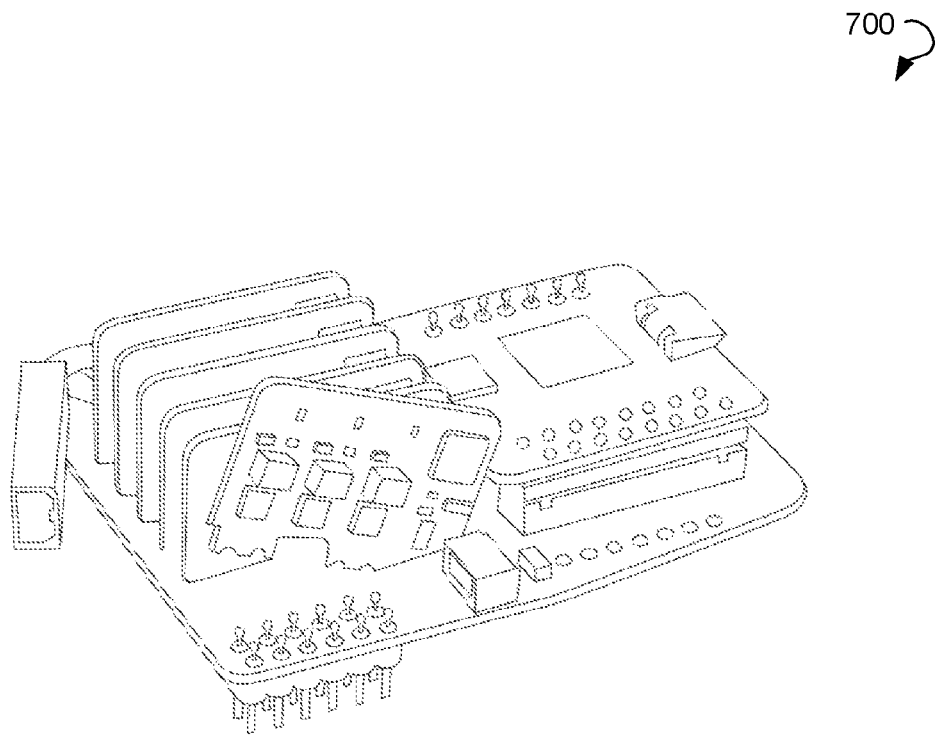
FIGS. 7A and 7B show modular electronics systems, in accordance with some embodiments.
Figure 7B:
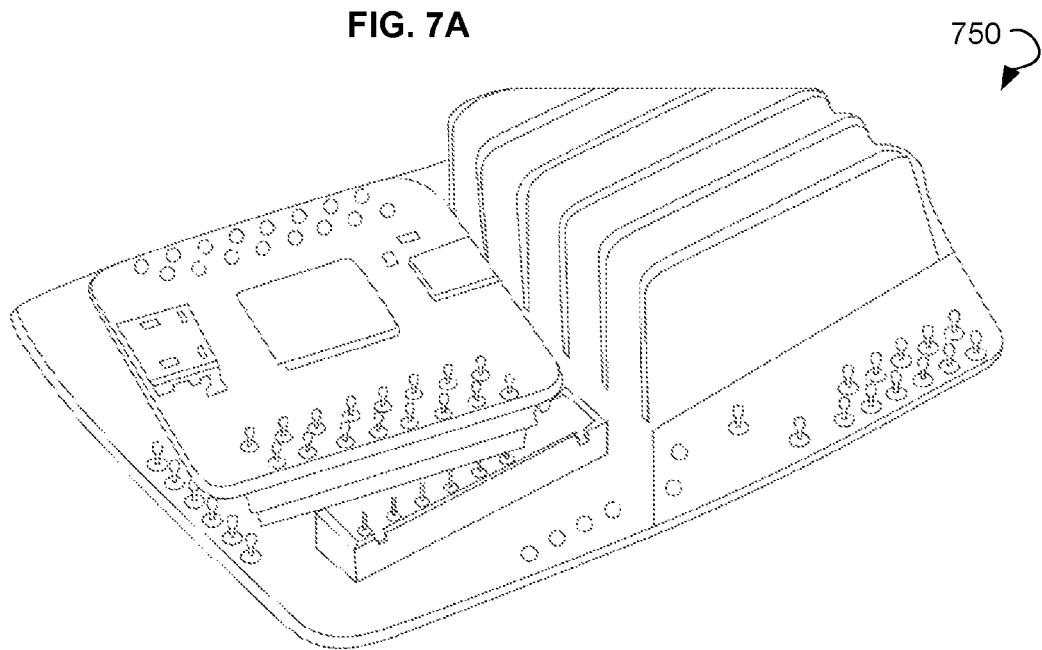

FIGS. 7A and 7B shows schematic views of modular electronics systems 700 and 750, respectively, in accordance to some embodiments. The modular electronics systems 700 and 750 may be used in the device 100.

The device 100 may further include a tilt fuselage device, a tilt wing device, and a tilt rotor device. Additionally, the device 100 may include a battery. The shape of the battery may conform to the interior shape of the device 100 to maximize the use of the internal volume of the device 100. The device 100 may include through-wall wire and antenna feedthroughs which may be sealed to prevent water leakage. The two-way telemetry transmitter may send GPS coordinates back to the operator in the case of the device 100 is lost. Referring back to FIG. 1, the device 100 may include a cooling system 104. The cooling system 104 may be selected from ventilation cooling units, heat sink cooling units, liquid cooling units, and fan cooling units. The device 100 may further include a detachable skin or shell for impact absorption and scratch protection. Furthermore, device 100 may include lights for clear camera vision or lights for signaling, such as for the reception of a command, warning messages, and/or status reports. In case the device 100 is a multirotor vehicle, the device 100 may utilize a lap counter that may function by communication between a sensor and an onboard transponder. The multirotor vehicle may utilize a quick connect payload system which may operate by a click in place, snap in place, screw in place, or slide in place mechanism. The device 100 may comprise at least one claw for grasping instruments used to observe or capture specimens, handle specimens, and transportation. The device 100 may comprise an inclined launching platform. In example embodiments, device 100 may be launched at an obtuse angle to the ground for expedient takeoff. The multirotor vehicle may embody a charging station that may recharge multiple batteries at the same time, and a sustainable green electricity generator onboard or at the ground station. Additionally, the device 100 may be configured to be launched from a body of a user, such as from hands. The device 100 may be controlled by the user using a mobile and wearable device, such as a smartwatch or a phone, via motion gestures, buttons, and a touch screen of the a mobile and wearable device. In particular, the mobile and wearable device may enable to user to submit a trip request. The trip request may be routed to the device 100 to initiate a peer-to-peer pick up service or a cargo transportation.

The device 100 may further include a deployable parachute in case of the failure of the device 100 when airborne.

The multirotor vehicle may include devices for internally housing or externally attaching a payload of goods. As an example of an externally housed payload, the device 100 may comprise a motorized or pressurized latch mechanism attached onto the payload or payload housing for an impermanent time period. As an example of an internally housed payload, the device 100 may comprise an empty internal storage area that may be accessed by a motorized or pressurized hatch. The payload may be left at the destination by ways involving the device 100 to descend to an altitude below 15 feet. The payload may also be left at the destination by a free fall parachute or a guided parachute.

The device 100 may further include an integrated modular electronics system that may include a central flight control component (including sensors and control parameters), electronic speed controllers, a power distribution harness or board, a telemetry module, a radio control receiver, and a video transmitter. The power distribution board may serve as the platform upon which the other electronics components may be linked to each other and the power distribution board by numerous pins, soldering connections, and a minimal amount of wires. The various components may be arranged to compact within a single board that can be serviced with hardware updates. Individual electronics components may be substituted if broken or outdated, simply by desoldering a one part solder connection or detaching a two part pin connection or plug connection.

The plurality of hatches of the internal components of the device 100 serve a double purpose: the first purpose is an internal access and system modification, the second purpose is to allow subsequent hardware upgrades. For example, the transmitter or receiver antennas, which come in different sizes per frequency, must have a specifically sized exit hole per desired antenna upgrade. The original antennas exit may be substituted with another hatch having different hole sizes. The upgraded antennas may exit soundly.

In another example embodiment, increased battery capacity may be desired for endurance flights. The swappable hatches may accommodate a battery within a waterproof shell, and may be substituted with the hatch to fasten the described dual purpose battery hatch-module.

The device 100 may further include a radio control and video systems that may run on different very high frequency (30-300 MHz), ultra-high frequency (300 MHz-3 GHz), or super high frequency (3-30 GHz) channels. The very high and ultra-high frequency categories offer the best obstacle penetration and may be used with high gain (10-30 dBic) antennas and high power (800 mw-10 w) transmitter/receiver sets for wireless underwater communication and long range aerial communication.

The device 100 may include onboard or separate media editing systems for virtual reality views, interactive video, or stitched photos. If the onboard media editing systems are used, a transformed footage may be downlinked to the operator in real time with low latency. When low latency footage cannot be achieved, the onboard media editing systems may transform the media before or shortly after landing. If onboard media editing systems are not implemented, post-capture media editing methods may be applied.

FIG. 8A represents diagram 820, FIG. 8B represents diagram 830, FIG. 8C represents diagram 840, FIG. 8D represents diagram 860, and FIG. 8E represents diagram 880 that show amphibious VTOL unmanned devices, according to example embodiments. As represented on the diagrams 820, 830, 840, 860, and 880 of FIGS. 8A-8E, respectively, an amphibious VTOL unmanned device 800 may be configured as a flying car and may include a modular and expandable waterproof body 802. A chassis 804 may be attached to the body 802. Furthermore, the device 800 may include an outer body shell 806. The outer body shell 806 may include one or more pieces 812. The device 800 may further include a door 808, 810 connected to the modular and expandable waterproof body. The door 808, 810 may be selected from a gull wing door and a falcon wing door.

In further example embodiments, the device 800 may include a propulsion system schematically shown as a propulsion system 832 on FIG. 8A. The propulsion system 832 may be selected from a coaxial propulsion system and a single-rotor propulsion system. The propulsion system 832 may comprise a plurality of motors (not shown). Each of the motors may be associated with a plurality of propellers 814, 816, 818, 822, 824, and 828 associated with the plurality of motors. The propellers 814 and 818 may be mounted on lateral sides of the device 800, as shown on diagrams 820, 830, 840, 860, and 880 of FIGS. 8A-8E, respectively. Furthermore, several propellers, such as the propellers 822 and 824, may be located in a rear portion of the device 800, as shown on diagrams 830 and 840. In further embodiments, only one propeller may be located in the rear portion of the device 800, such as the propeller 816. Additionally, the propeller 828 may be located in a front portion of the device 800. Diagram 820 of FIG. 8A and diagram 860 of FIG. 8D show propellers 814, 816, 818 in a first mode when the device 800 is operable to perform a vertical takeoff. Diagram 860 of FIG. 8D shows propeller 828 in a first mode when the device 800 is operable to perform the vertical takeoff. Diagram 830 of FIG. 8B shows propellers 824, 822 in the first mode when the device 800 is operable to perform the vertical takeoff. Diagram 840 of FIG. 8C and diagram 880 of FIG. 8E show propellers 814, 818 in a second mode when the device 800 is operable to perform flying. Diagram 880 of FIG. 8E shows propellers 816, 828 in the second mode when the device 800 is operable to perform flying. Diagram 840 of FIG. 8C shows propellers 822, 824 in the second mode when the device 800 is operable to perform flying.

In an example embodiment, the plurality of motors and propellers may include ducted propellers, such as multi-blade ducted fans, fixed pitch propellers, controllable pitch propellers, two-position propellers, full feathering propellers, and tilted propellers. In a further example embodiment, the plurality of motors and propellers may include two motors and propellers, three motors and propellers, four motors and propellers, five motors and propellers, and six motors and propellers. In an example embodiment, at least one of the plurality of motors and propellers is located on a foldable wing, the foldable wing folding in a ground mode and unfolding in a flight mode.

Figure 11B:
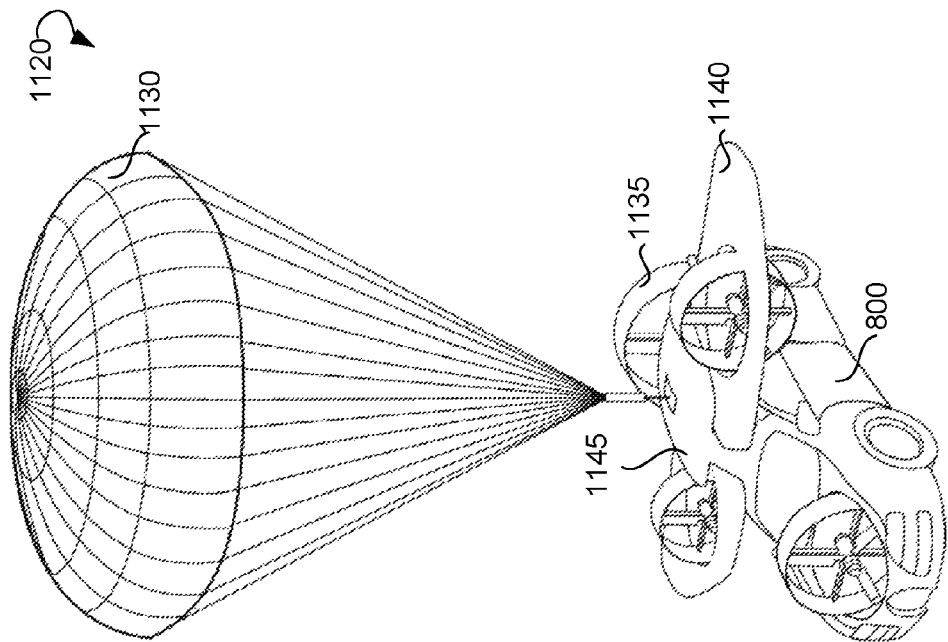
FIGS. 11A and 11B show example amphibious vertical takeoff and landing unmanned devices, in accordance with some embodiments.

In a further embodiment, one of the plurality of motors may be a solar turbine powered impeller motor disposed centrally in the device 800, such as for example, a solar turbine powered impeller motor 1135 shown on FIG. 11B. The solar turbine powered impeller motor 1135 may include an electric-drive impeller. The electric-drive impeller may be contained in a compression chamber and may have an axis of rotation oriented perpendicularly to an axis of the device 800. The solar turbine powered impeller motor 1135 may be powered by a solar film. The solar film may be integrated on an upper surface of the device 800, such as a surface 1140 or a surface 1145 as shown on FIG. 11B, a lower surface of the device 800, and the at least one wing of the device 800. The solar turbine powered impeller motor 1135 may be further powered by the electrical power storage device.

The at least one wing of the device 800 may include a left forward swept wing and a right forward swept wing. The left forward swept wing and the right forward swept wing may be mounted on the chassis. An example wing is shown on FIG. 12D as a retractable wing 1245, as will be described below.

The propellers may further include a first brushless ducted fan and a second brushless ducted fan integrated left and right of the chassis. The first brushless ducted fan and the second brushless ducted fan may be powered by the solar film. Furthermore, the first brushless ducted fan and the second brushless ducted fan may be associated with a brushless electric motor operable to spin the electric-drive impeller to provide at least one air accelerator ring with compressed forced air thrust. The solar film also may recharge capacitors for the propulsion of the device 800 with persistent flight endurance targeted for 7-30 days.

FIG. 9A represents diagram 905, FIG. 9B represents diagram 920, FIG. 9C represents diagram 930, FIG. 9D represents diagram 940, FIG. 9E represents diagram 950, FIG. 9F represents diagram 960, FIG. 9G represents diagram 970, and FIG. 9H represents diagram 980 showing a further example embodiment, according to which the device 800 may have a propeller protection system 910. The propeller protection system 910 may include a wing tip folding mechanism. Diagram 905 of FIG. 9A and diagram 920 of FIG. 9B show the propeller protection system 910 in an unfolded mode. Diagram 950 of FIG. 9E shows a front view of the propeller protection system 910 in the unfolded mode. Diagram 980 of FIG. 9H shows a rear view of the propeller protection system 910 in the unfolded mode. Diagram 960 of FIG. 9F shows a right side view of the propeller protection system 910 in the unfolded mode. Diagram 970 of FIG. 9GA shows a left side view of the propeller protection system 910 in the unfolded mode. Diagram 930 of FIG. 9C shows the propeller protection system 910 in a semi-folded mode. Arrow 915 show a direction of folding of the propeller protection system 910. Diagram 940 of FIG. 9D show the propeller protection system 910 in a folded mode. Arrow 925 shows a direction of folding of the propeller protection system 910 to transform the propeller protection system 910 from the semi-folded state to the folded state.

The propeller protection system 910 may fully or partially surrounds any type of propellers, such as self-tightening fixed pitch propellers and variable pitch propellers.

In further example embodiments, the device 800 may include a surface skidding material platform and a landing system (may be represented by chassis 804). The landing system may conform to a landing surface. Additionally, the device 800 may include one or more control surfaces (such as a control surface 550 as shown on FIG. 5) selected from a group comprising: a rudder, an aileron, a flap, and an elevator. The device 800 may be operable to perform an automatic landing and an automatic takeoff.

In an example embodiment, the device 800 further includes a ballast. The ballast may be a permanently fixed ballast or a detachable ballast. Additionally, the device 800 may include an onboard air compressor schematically shown as an onboard air compressor 922 on FIG. 9D, an onboard electrolysis system schematically shown as an onboard electrolysis system 924 on FIG. 9D, at least one waterproof through-body wire or antenna feed-through schematically shown as a waterproof through-body wire or antenna feed-through 926 on FIG. 9D.

In a further example embodiment, the device 800 may include a tilt-motor device. FIG. 10A shows diagram 1010, FIG. 10B shows diagram 1020, FIG. 10C shows diagram 1030, and FIG. 10D shows diagram 1040, on which the device 800 includes a tilt-motor device 1025, a tilt wing device 1015, and a tilt fuselage device (not shown). The device 800 may further include at least one tilt rotor device embedded into the door 808, 810. The tilt-motor device 1025 may tilt the propellers 1035 and the tilt wing device 1015 tilt the propellers 1045. Arrows 1055 show a direction of rotation of the tilt-motor device 1025. Diagrams 1010, 1020, and 1030 show propellers 1035, 1045 located in a first mode when the device 800 may perform a vertical takeoff. Diagram 1040 shows propellers 1035, 1045 in a second mode when the device 800 may perform flying.

In an example embodiment, the device 800 may further include a battery 1012 schematically shown on FIG. 10A. A shape of the battery 1012 may conform to an interior profile of the modular and expandable waterproof body. The battery may be a lithium ion polymer (Li—Po or Li-Poly) battery that conforms to the interior profile, and includes a built-in battery charge indicator.

Additionally, the device 800 may include a power distribution board 1014 schematically shown on FIG. 10A. The power distribution board 1014 may be associated with one or more of the following devices: a flight controller, electronic speed controllers, a buzzer, an onscreen display telemetry device, a video transmitter, a radio control receiver, and so forth. In some embodiments, the power distribution board 1014 may act as the chassis of the device 800.

In a further example embodiment, the device 800 may include a Global Positioning System (GPS) module 1016, a lost model alert 1018, a cooling device 1022, such as a heat sink, a fan, or a duct, a detachable impact absorbing skin or shell 1024, vision aiding and orientative lights 1026, such as light emitting diodes, one or more hatches, quick connect payloads, a lap counter for racing, a flat or inclined launch platform or footing (not shown), one or more claws with at least one degree of freedom, an apparatus for internally housing a cargo, a charging station 1042 for multiple batteries, as shown on FIG. 10C. Therefore, the device 800 may serve as a vehicle for carrying people or cargos. In further example embodiments, the device 800 may be configured as one of the following: an autonomous vehicle, a multi-blade ducted fan roadable electric aircraft, an uncrewed vehicle, a driverless car, a self-driving car, an unmanned aerial vehicle, a drone, a robotic car, a commercial goods and passenger carrying vehicle, a private self-drive vehicle, a family vehicle, a military vehicle, and a law enforcement vehicle.

The autonomous vehicle may be configured to sense environmental conditions, navigate without human input, and perform autopiloting. The sensing of the environmental conditions may be performed via one or more of the following: a radar, a lidar, the GPS module, and a computer vision module. The processor of the device 800 may be operable to interpret sensory information to identify navigation paths, obstacles, and signage. The autonomous vehicle may be also operable to update maps based on sensory input to keep track of a position when conditions change or when uncharted environments are entered.

The multi-blade ducted fan roadable electric aircraft may be propelled by one or more electric motors using electrical energy stored in the electrical power storage device.

The charging station of the device 800 may include a fireproof bunker. The device 800 may include a partial vacuum device 1044 configured to perform cooling and increase buoyancy. Furthermore, the device 800 may include an onboard electricity generator 1046 that may comprise a plurality of solar cells, such as carbon fiber hybrid solar cells, three-dimensional printed parts or four-dimensional printed parts, one or more wind turbines, and one or more hydroelectric generators.

Figure 11A:
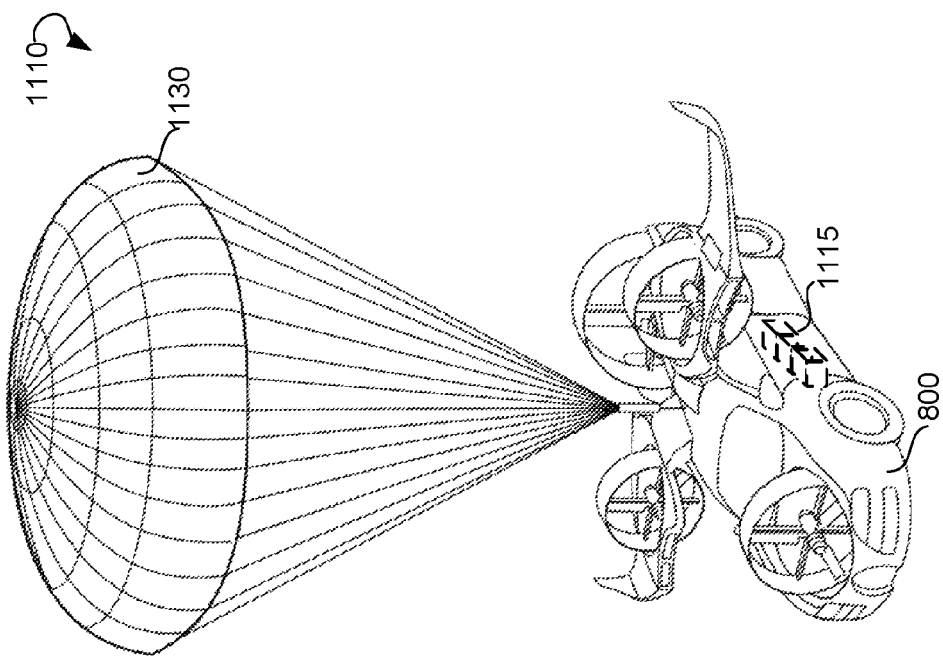

Additionally, the device 800 may include a parachute. FIG. 11A shows diagram 1110 and FIG. 11B shows diagram 1120, which represent the device 800 having a parachute 1130. The parachute 1130 may be a manually deployable parachute or an automatically deployable parachute.

In a further example embodiment, the device 800 may include one or more modules attached to the modular and expandable waterproof body. The one or more modules are schematically shown as modules 1115 on FIG. 11A and may include a waterproof battery module, a turbine, a solar panel, a claw, a camera stabilization device, a thermal inspection device, an environmental sample processor, a seismometer, a spectrometer, an osmosampler, a night vision device, a hollow waterproof module for upgrades, third-party gear, and hardware upgrades.

In a further example embodiment, the battery may be partially or completely modular. The electronic speed controllers may be configured to detach from an electronic speed controller stack. The video transmitter and the radio control receiver may be removable for upgrade. The onscreen display telemetry device may be removable for upgrade. The plurality of motors may be removable for upgrade. The flight controller may be configured to detach from the power distribution board.

In a further example embodiment, the modular and expandable waterproof body may have a back portion and a front portion. The back portion and the front portion may show colors for ease of user orientation.

In a further example embodiment, the propulsion system may be powered by a high pressure gas and direct current brushless motors. The propellers may be attached directly to a motor shaft associated with one or more of the plurality of motors or may be mechanically linked to one or more of the plurality of motors through a series of pulley belts.

In a further example embodiment, the device 800 may include the landing system configured to retract, absorb shock, conform to a launching surface, and house or carry antennas.

In further example embodiments, the variable pitch propellers may be actuated by servoactuators or one or more of the plurality of motors. Additionally, the propellers may be foldable or removable. FIG. 12A shows diagram 1210, FIG. 12B shows diagram 1220, FIG. 12C shows diagram 1230, FIG. 12D shows diagram 1240, which represent the device 800 that has foldable propellers 1205. The foldable propellers 1205 may be attached to arms 1215. The arms 1215 may be permanently attached, removable, or foldable. Arrows 1225 show a direction of rotation of the arms 1215.

Additionally, a retractable wing 1245 may be connected to the device 800. Arrows 1235 show a direction of rotation of the retractable wing 1245.

FIG. 13A shows diagram 1310, FIG. 13B shows diagram 1320, FIG. 13C shows diagram 1330 that represent the device 800 having the retractable wing 1245 in an extended mode. Arrow 1305 shows a direction of movement of the retractable wing 1245 from a folded mode into the extended mode. Additionally, the foldable propellers 1205 may be tilted. Diagrams 1310 and 1320 show the foldable propellers 1205 in an initial position and diagram 1330 shows the foldable propellers 1205 in a tilted position.

In further example embodiments, the motors of the device 800 may include a brushless motor, a brushed motor, an outrunner motor, and an inrunner motor. The motors may spin with 1800-2400 revolutions per volt to be paired with propellers having 4-8 inch diameter and 3-6 inches of pitch per rotation, or 80-700 revolutions per volt to be paired with larger propellers with larger pitch, such as 10-18 inch diameter propellers with 4-12 inches of pitch per rotation.

In further example embodiments, the device 800 may include a plurality of rotors. The motors may be attached to at least one arm. A mating tilt mechanism to the at least one arm may be actuated by one or more motors or a servomotor drive train. The servomotor drive train and the one or more motors may be connected to the at least one arm. The motors may be non-aligned on at least one axis.

In the device 800, a position of the pulley belts may be set by guide rails, grooved guide pulleys, or cylindrical guide pulleys, and tightened with a tensioner clamp. The pulley belt may be configured to connect pulleys on the arms with a servo pulley.

Figure 14:
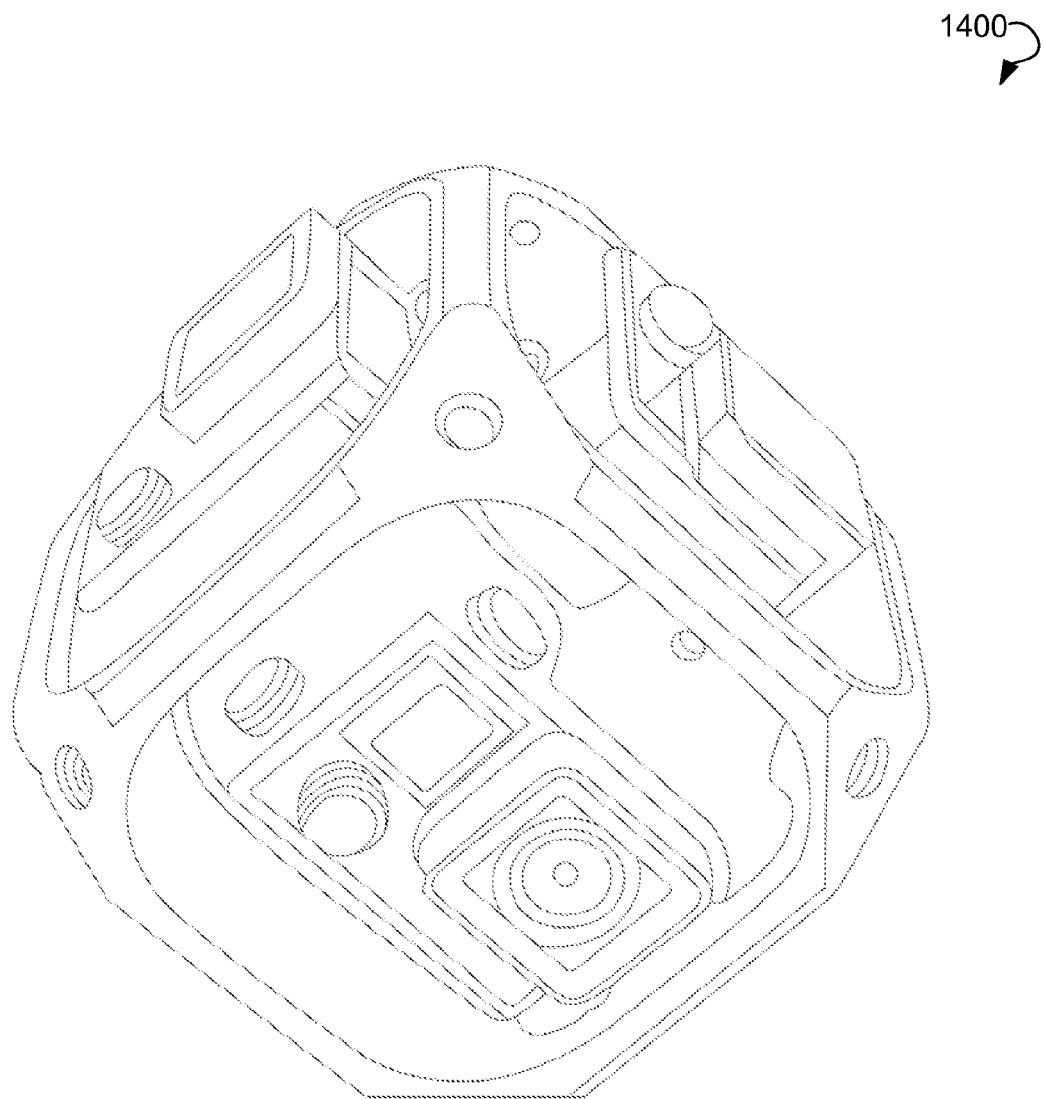
FIG. 14 shows onboard cameras for providing a real-time first-person video and a real-time first-person view, in accordance with some embodiments.

The present disclosure also refers to a video capture, realtime broadcast, and video downlink system for an amphibious VTOL unmanned device. The system may include a camera stabilization device, a camera movement device configured move the camera, and one or more onboard cameras for providing a real-time first-person video and a real-time first-person view and normal footage video recording and 360-degree panoramic video recording used for virtual reality views and interactive video. FIG. 14 shows a kit 1400 of one or more onboard cameras for providing a real-time first-person video and a real-time first-person view.

Figure 15:
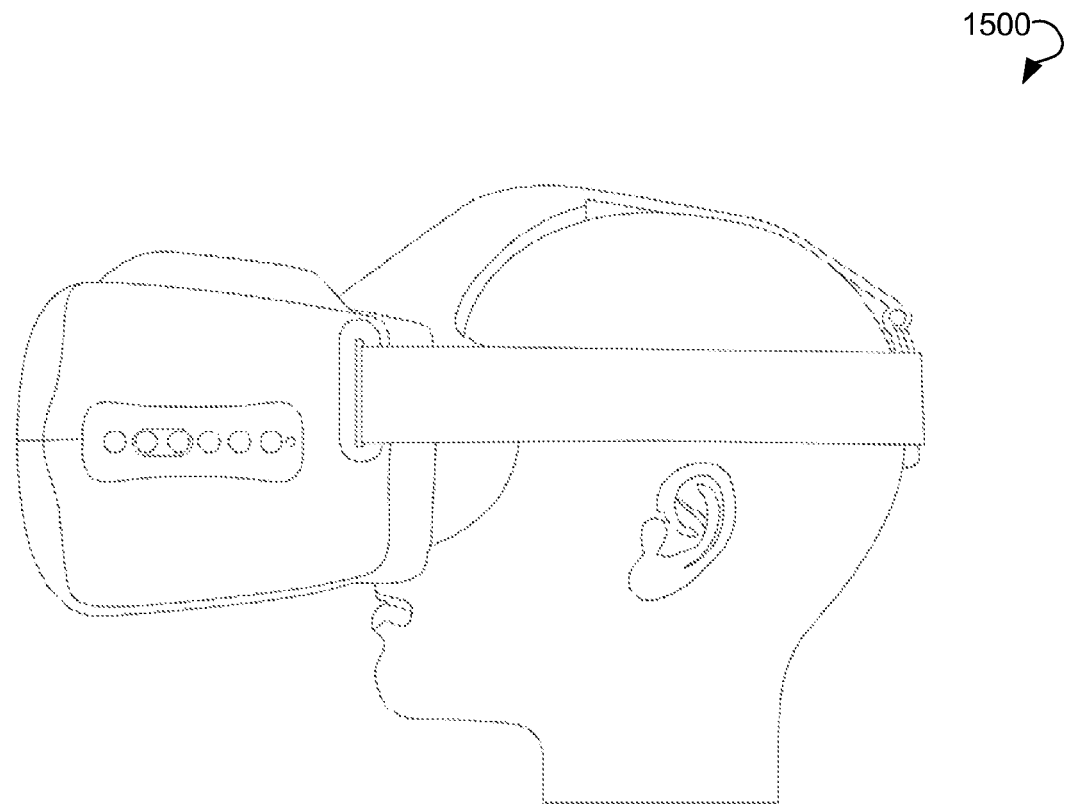
FIG. 15 shows a headset configured to enable the real-time first-person video and a real-time first-person view, in accordance with some embodiments.

The system may further include a video transmitter and receiver device configured to perform high definition low latency real time video downlink. The video transmitter and receiver device may be a high power, high gain, and ultra-high frequency device. The system may further include a one way and two way telemetry device, a live broadcast device, and a headset configured to enable the real-time first-person video and a real-time first-person view. FIG. 15 shows a headset 1500 configured to enable the real-time first-person video and a real-time first-person view.

In further example embodiments, the system may further include a public database for viewing flight or dive activity, software for licensing videos with a watermarked preview, software for autonomously extracting usable footage and compiling the usable footage into a video montage synced to music, onboard or separate software for stitching photos to form a modified photo, and onboard or separate software for stitching videos to form virtual reality views or interactive video.

In an example embodiment, the one or more onboard cameras may be configured to adjust one or more of the following parameters: zoom, shutter speed, aperture, ISO, focal length, depth of field, exposure compensation, white balance, video or photo frame size and orientation, camera resolution and frame rates; switch cameras used for live streaming, digitally stabilize video; capture panoramic photos, capture thermal measurements, edit color correction, produce night vision images and video, produce flash. The cameras may have one or more lens filters. The cameras may be configured to be mounted on surfaces of the amphibious VTOL unmanned device on a motorized camera stabilization device or a vibration free mount. The motorized camera stabilization device may be actuated by a brushless motor, a brushed motor, a coreless motor, or a geared motor.

Additionally, the cameras for capturing panoramic views may be mounted on a multi-camera spherical rig. The multi-camera spherical rig may be mounted onto a camera stabilization device or a fixed mounting device. A content captured by the cameras may be combined to create a panoramic video. The headset 1500 shown on FIG. 15 may be used by a user to view the panoramic video. A viewing angle may be controlled by one or more of the following: head tracking, pressing arrow keys, dragging a screen of the headset, and clicking and dragging a compass icon. Additionally, the headset 1500 may include a video receiver, such as an internally housed video receiver, an externally mounted video receiver, and a separate video receiver, and an integrated camera to enable a user to see surroundings.

Furthermore, the video transmitter and receiver device of the system may be configured to control one or more of the following: an omnidirectional or directional antenna, a low pass filter, a ninety degree adapter, head tracking and eye tracking to manipulate movement of the camera stabilization device for video capture or live playback, antenna tracking on the ground station or onboard.

In an example embodiment, the one way and two way telemetry device may be configured to control an on screen display to inform a user of battery voltage, current draw, signal strength, minutes flown, minutes left on battery, joystick display, flight and dive mode and profile, amperage draw per unit of time, GPS latitude and longitude coordinates, an operator position relative to a position of the amphibious VTOL unmanned device, number of GPS satellites, and artificial horizon displayed on a wearable device, such as a tablet, a phone, and the headset. Additionally, the one way and two way telemetry device may be configured to provide a follow-me mode when the amphibious VTOL unmanned device uses the wearable device as a virtual tether to track the user via the camera when the user moves. In an example embodiment, a first person may carry a ground station and may be followed by the amphibious VTOL unmanned device, and a second person may carry a controller and may be ready to regain manual control at any time. The follow-mw mode may require a GPS enabled wearable device. The follow-me mode may make it possible for the user to have a flying car follow the user as the user moves by using a telemetry radio and a ground station. The follow-me mode may be implemented by using the wearable device as the ground station.

In an example embodiment, the live broadcast device may include an onboard High Definition Multimedia Input port operable to transmit standard definition, high definition, virtual reality, and interactive video to one or more bystanders. The interactive video may be broadcasted on at least one of the following: a screen, a projector, a split screen, a switch screen, and the headset. The live broadcast device may further comprise an aerial, ground, and marine vehicle for filming the amphibious VTOL unmanned device.

The present disclosure also refers to a collision avoidance, flight stabilization, and multi-rotor control system for an amphibious VTOL unmanned device. The system may be configured as a flying car and may include a flight and dive control device configured to perform one or more of the following: auto level control, altitude hold, return to an operator automatically, return to the operator by manual input, operating auto-recognition camera, monitoring a circular path around a pilot, and controlling autopilot, supporting dynamic and fixed tilting arms. The system may further include one or more sensors and one or more cameras configured to control one or more of the following: obstacle avoidance, terrain and Geographical Information System mapping, close proximity flight including terrain tracing, and crash resistant indoor navigation. The system may additionally include an autonomous takeoff device, an auto-fly or dive to a destination with at least one manually or automatically generated flight plan, an auto-fly or dive to the destination by tracking monuments, a direction lock, a dual operator control device, a transmitter and receiver control device. The transmitter and receiver control device may include one or more antennas. The antennas may be high gain antennas. The transmitter and receiver control device may further include a lock mechanism operated by one or more of the following: numerical passwords, word passwords, fingerprint recognition, face recognition, eye recognition, and a physical key. The system may further include at least one electronic speed controllers (ESC) selected from a standalone ESC and an ESC integrated into a power distribution board of the amphibious VTOL unmanned device. The ESC may be operable to program a motor spin direction without reconnecting wires by the user via spinning a motor in a predetermined direction, and record an input.

In an example embodiment, the device 800 may further include a first rotor (shown as propellers 102 on FIG. 1 and a fixed pitch propeller 205 and a variable pitch propeller 255 on FIG. 2) operable to rotate about a first axis and tilt about a second axis between a helicopter mode and an aeroplane mode. The first rotor may include a shaft operable to rotate about the first axis and tilt about the second axis between the helicopter mode and the aeroplane mode. The first axis may be transversal to a longitudinal direction of the device 800 in the helicopter mode and may be substantially parallel to the longitudinal direction in the aeroplane mode. The device 800 may further include a second rotor (not shown) operatively connected to the shaft of the first rotor. The device 800 may further include an electrical power storage device (shown schematically as an electrical power storage device 1312 on FIG. 13A) and an electrical machine shown schematically as an electrical machine 1314 on FIG. 13A). The electrical machine may include a stator electrically connected to the electrical power storage device. The electrical machine may act as an electric motor for driving rotation of the first rotor by using the electrical power storage device. The electrical machine may further act as an electrical power generator for re-charging the electrical power storage device by causing the rotation of the second rotor under action of a wind current.

The one or more sensors are selected from a group of the following sensors: individual sensors, stereo sensors, ultrasonic sensors, infrared sensors, multispectral sensors, optical flow sensors, and volatile organic compound sensors. The one or more sensors may be provided for intelligent positioning, collision avoidance, media capturing, surveillance, and monitoring.

In some embodiments, the system may include an open source code and an open source software development kit. The system may further include a processor. The processor may include a flight controller. The flight controller may include an external micro controller or an internal micro controller, and a barometer, an accelerometer, a gyroscope, a GPS, and a magnetometer.

The flight and dive control device may be configured to perform stable transitions between a hover mode, a full forward flight mode, and an underwater mode, enable or disable a GPS, record flight parameters, allow inverted flight, aerial and aquatic rolls and flips, and stabilize proportional, integral, and derivative gains above water and below water. Additionally, the flight and dive control device may be configured to restrict the amphibious VTOL unmanned device to fly-safe locations, receive and enact force shut-off commands associated with a manufacturer, receive software updates from the manufacturer, activate the amphibious VTOL unmanned device after a user inputs an arming action or an arming sequence, Furthermore, the flight and dive control device may be configured to provide thrust compensation for body inclination by acting as a body pitch suppressor to maintain an altitude in forward flight and compensate yaw and roll mixing when rotors of the amphibious VTOL unmanned device tilt.

The system may further include a radio control device operable to control an omnidirectional or directional antenna, antenna tracking on a ground station or onboard the amphibious VTOL unmanned device tilt, a low pass filter, ninety degree adapter, a detachable module for RC communication on a channel having a frequency selected from 72 MHz, 75 MHz, 433 MHz, and 1.2/1.3 GHz, adjustable dual rates and exponential values, at least one dial or joystick for controlling the movement of a camera stabilization device, one or more foot pedals, a slider, a potentiometer, and a switch to transition between a flight profile and a dive profile. The radio control device may be controlled by stick inputs and motion gestures. In further embodiments, the radio control device may be further operable to perform automatic obstacle avoidance and automatic maneuvering around an obstacle when the amphibious VTOL unmanned device performs a flight in a predetermined direction. For example, when the user wants the amphibious VTOL unmanned device to fly forwards through obstacles, such as trees, the user needs only to signal the amphibious VTOL unmanned device to go forwards, and the amphibious VTOL unmanned device may autonomously dodge through the obstacles. Additionally, the radio control device may be operable to turn on a swarm follow-me function by instructing a plurality of amphibious VTOL unmanned devices to follow a single subject and capture a plurality of views of the subject, where different amphibious VTOL unmanned devices capture different views of the same subject. In further example embodiments, the system may further include a navigation device. The navigation device may be configured to enable autonomous flying at low altitude and avoiding obstacles, evaluate and select landing sites in an unmapped terrain, and land safely using a computerized self-generated approach path. Furthermore, the system may be configured to enable a pilot aid to help a pilot to avoid obstacles, such as power lines, and select landing sites in unimproved areas, such as emergency scenes, during operating in low-light or lozv visibilitz conditions. Furthermore, the system may be configured to detect and maneuver around a man lift during flying, detect high-tension wires over a desert terrain, and enable operation in a near earth obstacle rich environment, The system may also include a navigation sensor configured to map an unknown area where obstructions limited landing sites and identify level landing sites with approach paths that are accessible for evacuating a simulated casualty. The navigation sensor may be configured to build three-dimensional maps of a ground and find obstacles in a path, detect four-inch-high pallets, chain link fences, vegetation, people and objects that block a landing site, enable continuously identifying potential landing sites and develop landing approaches and abort paths. Additionally, the navigation sensor may be configured to select a safe landing site being closest to a given set of coordinates. The navigation sensor may include an inertial sensor and a laser scanner configured to look forward and down. The navigation sensor may be paired with mapping and obstacle avoidance software. The mapping and obstacle avoidance software may be operable to keep a running rank of the landing sites, approaches and abort paths to enable responding to unexpected circumstances. Additionally, the amphibious VTOL unmanned device may include a lidar (shown as a lidar 1054 on FIG. 10D) and an ultrasonic radar sensor (shown as an ultrasonic radar sensor 1052 on FIG. 10D).

Further example embodiments of an amphibious VTOL unmanned device 800 configured as a flying car are represented on FIGs. 16A-16D, 17A and 17B, 18A-18D, 19A and 19B, 20A and 20B, 21A-21E, 22A and 21B. More specifically, FIG. 16A shows diagram 1610, FIG. 16B shows diagram 1620, FIG. 16C shows diagram 1630, FIG. 16D shows diagram 1640, which represent the device 800 that has a rotatable propulsion system 1605. The rotatable propulsion system 1605 may include a retractable wing 1615, arms 1625, and propellers 1635. Diagram 1610 of FIG. 16A shows the rotatable propulsion system 1605 in a folded position. Diagram 1620 of FIG. 16B shows the rotatable propulsion system 1605 in a folded rotated position. Diagram 1630 of FIG. 16C shows the rotatable propulsion system 1605 in an unfolded position. Diagram 1640 of FIG. 16D shows the rotatable propulsion system 1605 in an unfolded rotated position.

Figure 17B:
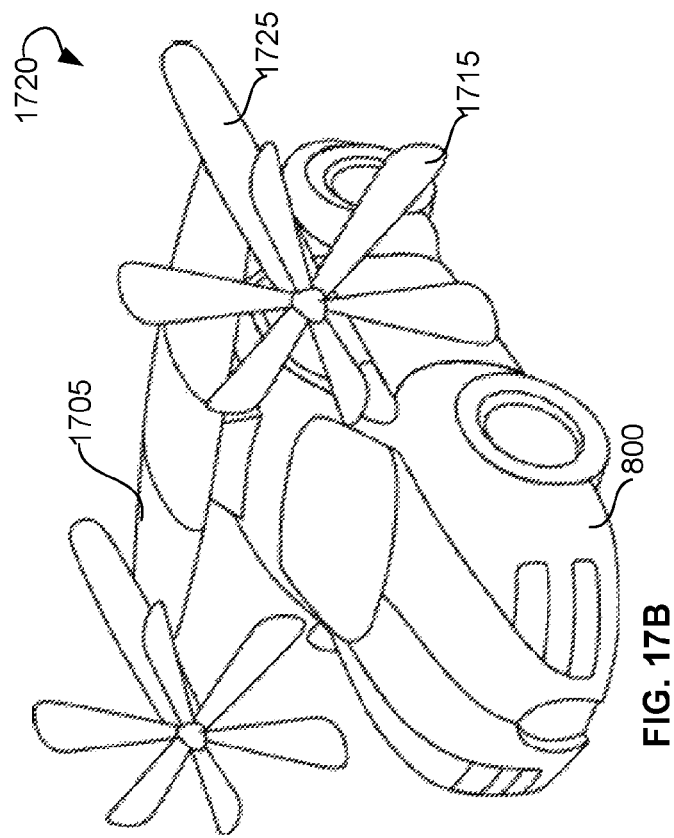
FIGS. 17A and 17B show example amphibious vertical takeoff and landing unmanned devices, in accordance with some embodiments.
Figure 17A:
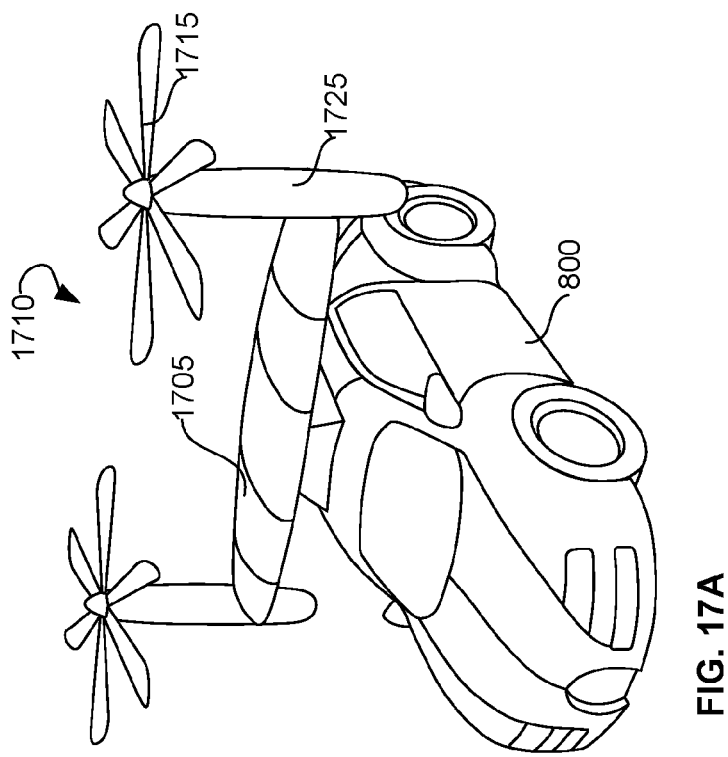

FIG. 17A shows diagram 1710, FIG. 17B shows diagram 1720, which represent the device 800 having a retractable wing 1705 and rotatable propellers 1715. Diagram 1710 of FIG. 17A shows the rotatable propellers 1715 in a first mode when the device 800 may perform a vertical takeoff. Diagram 1720 of FIG. 17B shows the rotatable propellers 1715 in a second mode when the device 800 may perform horizontal flying. The rotatable propellers 1715 may be rotated using rotatable arms 1725.

Figure 18B:
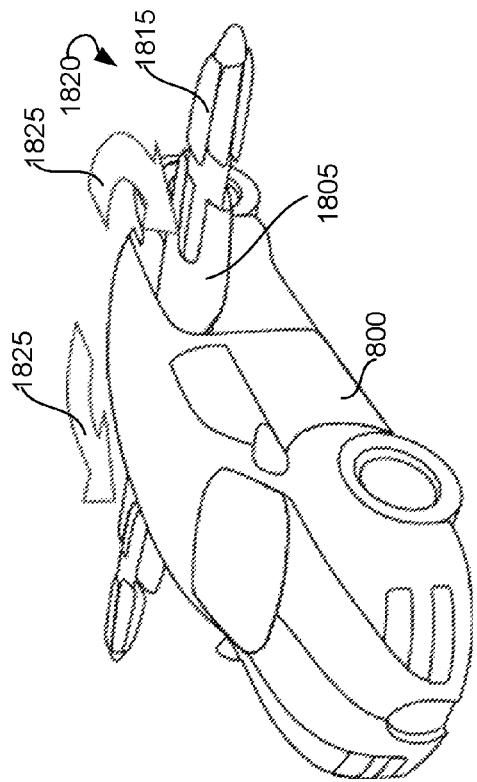
FIGS. 18A-18D show example amphibious vertical takeoff and landing unmanned devices, in accordance with some embodiments.
Figure 18A:
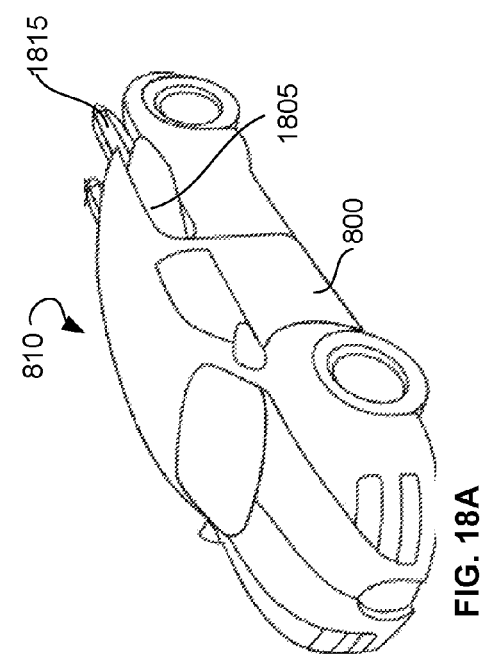
Figure 18D:
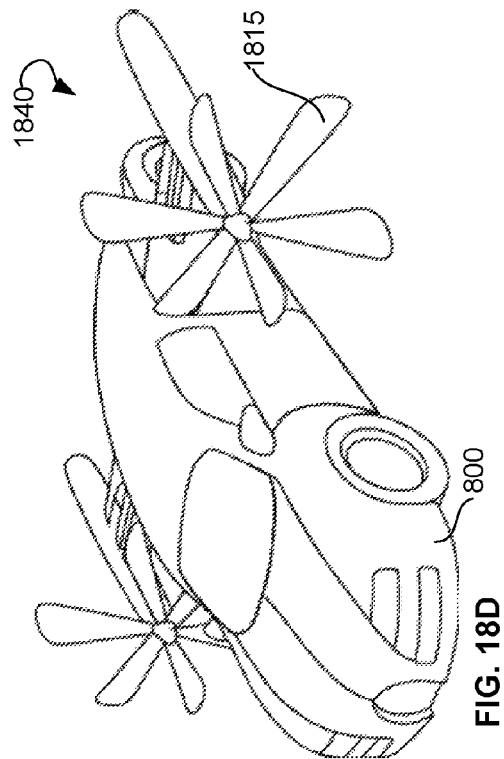
Figure 18C:
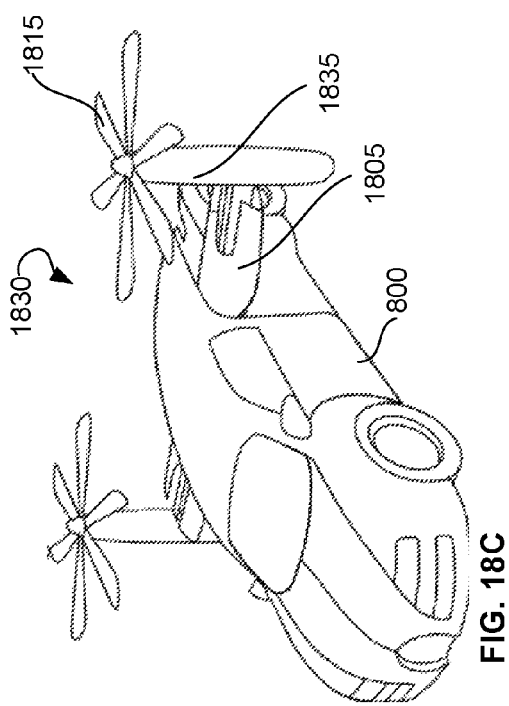

FIG. 18A shows diagram 1810, FIG. 18B shows diagram 1820, FIG. 18C shows diagram 1830, and FIG. 18D shows diagram 1840, which represent the device 800 having a rotatable wing 1805 and rotatable propellers 1815. Diagram 1810 of FIG. 18A shows a folded position of the rotatable wing 1805. Diagram 1820 of FIG. 18B shows an unfolded position of the rotatable wing 1805. Arrows 1825 show a direction of rotation of the rotatable wing 1805. Diagram 1830 of FIG. 18C shows the rotatable propellers 1815 in a first mode when the device 800 may perform a vertical takeoff. Diagram 1840 of FIG. 18ADshows the rotatable propellers 1815 in a second mode when the device 800 may perform horizontal flying. The rotatable propellers 1715 may be rotated using rotatable arms 1835.

FIG. 19A shows diagram 1910, FIG. 19B shows diagram 1920, which represent a multi-axis propulsion system 1905 of the device 800. Diagram 1910 of FIG. 19A shows rotatable propellers 1915 in a first mode when the device 800 may perform a vertical takeoff. Diagram 1920 of FIG. 19B shows the rotatable propellers 1915 in a second mode when the device 800 may perform horizontal flying. The rotatable propellers 1915 may be rotated using rotatable arms 1925.

Figure 20A:
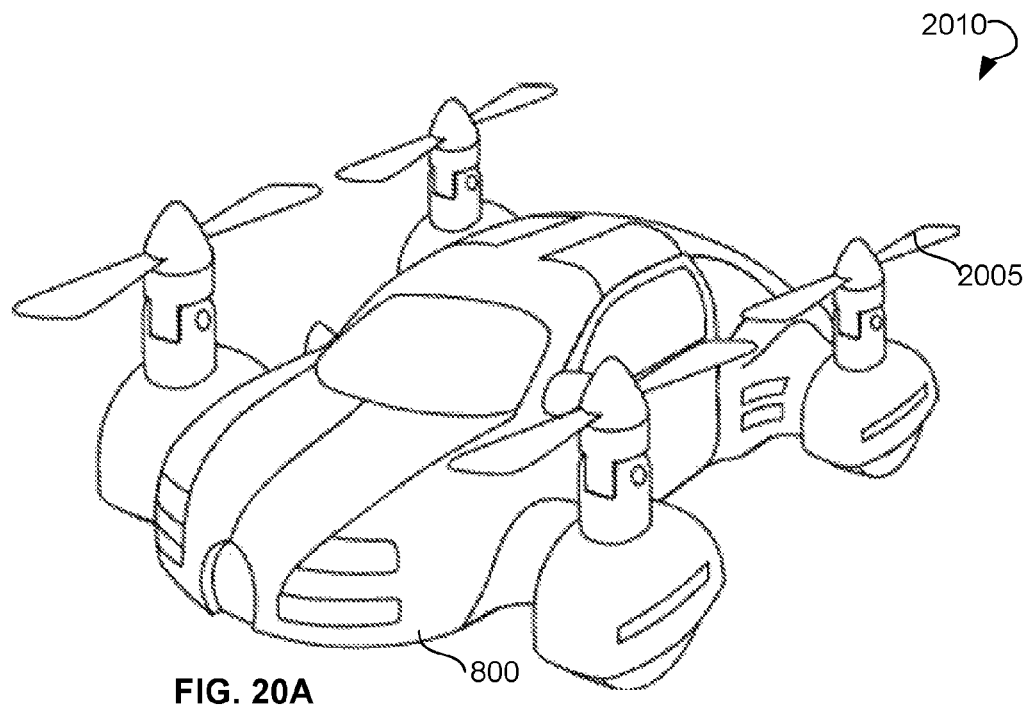
FIGS. 20A and 20B show example amphibious vertical takeoff and landing unmanned devices, in accordance with some embodiments.
Figure 20B:
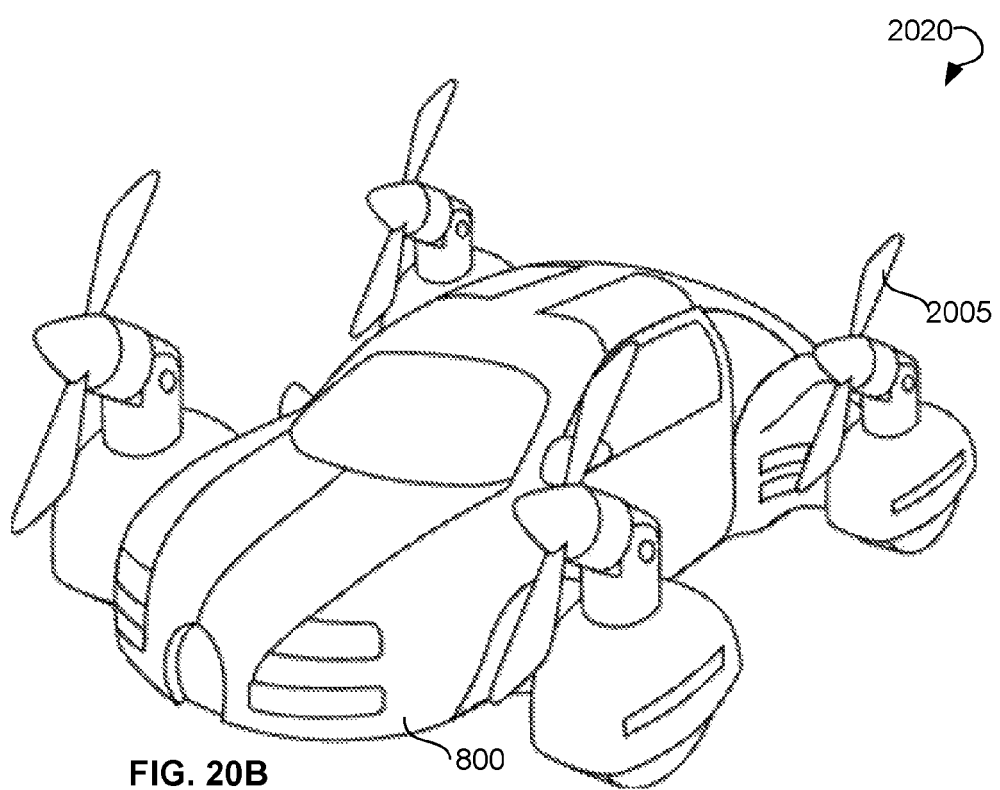

FIG. 20A shows diagram 2010, FIG. 20B shows diagram 2020, which represent the device 800 being a radio controlled toy. The device 800 may be operated using a radio communication channel. The device 800 may have rotatable propellers 2005. The device 800 in a form of the toy may be used for capturing first person views, recording video, performing photography, and so forth.

FIG. 21A shows diagram 2110, FIG. 21B shows diagram 2120, FIG. 21C shows diagram 2130, FIG. 21D shows diagram 2140, and FIG. 21E shows diagram 2150, which represent the device 800 having extruded wheels 2105 and rotatable propellers 2115. Diagram 2110 of FIG. 21A and diagram 2120 of FIG. 21B show a folded position of the rotatable propellers 2115. Diagram 2130 of FIG. 21C, diagram 2140 of FIG. 21D, and diagram 2150 of FIG. 21EA show an unfolded position of the rotatable propellers 2115. Arrows 2125 show a direction of unfolding of the rotatable propellers 2115. Diagram 2130 of FIG. 21C shows the rotatable propellers 2115 in a first mode when the device 800 may perform flying. Diagram 2130 of FIG. 21C, diagram 2140 of FIG. 21D, and diagram 2150 of FIG. 21EA show the rotatable propellers 2115 in a second mode when the device 800 may perform a vertical takeoff. The rotatable propellers 2115 may be rotated from the first mode to the second mode by rotating the rotatable propellers 2115 in a direction shown by arrows 2135.

Figure 22B:
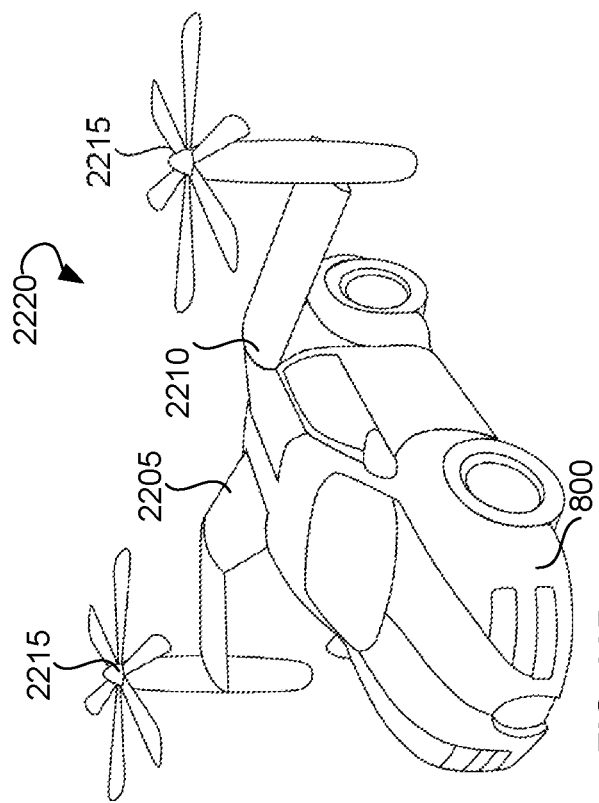
FIGS. 22A and 22B show example amphibious vertical takeoff and landing unmanned devices, in accordance with some embodiments.
Figure 22A:
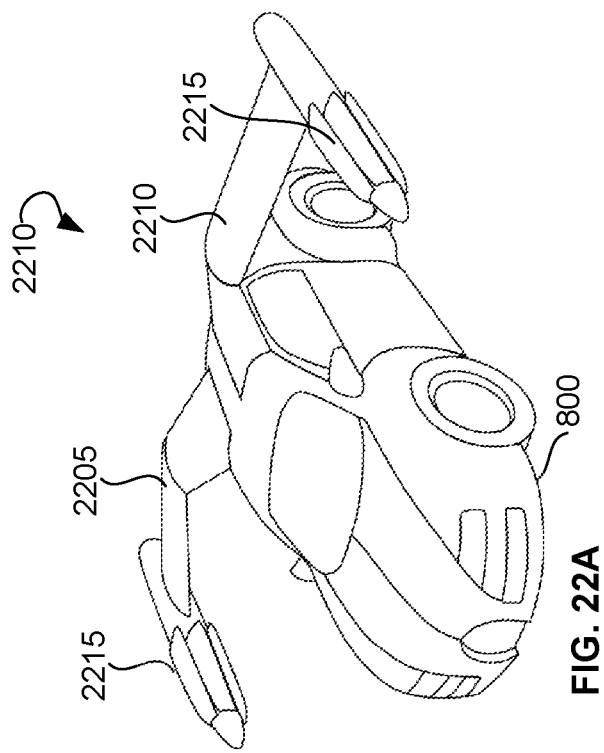

FIG. 22A shows diagram 2210 and FIG. 22B shows diagram 2220, which represent the device 800 that has two wings 2205 and 2210. Each of the wings 2205 and 2210 may have a propeller 2215. Diagram 2210 of FIG. 22A shows a folded position of the propellers 2215. Diagram 2220 of FIG. 22B shows an unfolded position the propellers 2215.

Thus, various an amphibious VTOL unmanned devices have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. An amphibious vertical takeoff and landing (VTOL) unmanned device comprising:
   a modular and expandable waterproof body;
   an outer body shell comprising one or more pieces;
   a propulsion system including a coaxial propulsion system, wherein the propulsion system comprises a plurality of motors and rotors associated with the plurality of motors, wherein the rotors are selected from a group comprising: clockwise rotors, counterclockwise rotors, and variable pitch rotors;
   a rotor protection system;
   at least one wing;
   a landing system that conforms to a landing surface, the landing system including at least a chassis;
   one or more control surfaces selected from a group comprising: a rudder, an aileron, a flap, and an elevator;
   an onboard air compressor;
   an onboard electrolysis system;
   at least one waterproof through-body wire or antenna feed-through;
   a tilt wing device;
   a door connected to the modular and expandable waterproof body, wherein the door is selected from a group comprising: a gull wing door and a falcon wing door;
   at least one tilt rotor device;
   a power distribution board comprising one or more of the following: a flight controller, electronic speed controllers, a buzzer, an on screen display telemetry device, a video transmitter, and a radio control receiver;
   wherein the rotors include at least a first rotor and a second rotor, the first rotor being operable to rotate about a first axis and tilt about a second axis between a helicopter mode and an aeroplane mode, wherein the first rotor comprises a shaft operable to rotate about the first axis and tilt about the second axis between the helicopter mode and the aeroplane mode; the first axis being transversal to a longitudinal direction of the amphibious VTOL unmanned device in the helicopter mode and being substantially parallel to the longitudinal direction in the aeroplane mode, and the second rotor being operatively connected to the shaft of the first rotor;

an electrical power storage device, wherein the electrical power storage device includes at least a battery, wherein a shape of the battery conforms to an interior profile of the modular and expandable waterproof body;

an electrical machine comprising a stator and an onboard electricity generator, the stator being electrically connected to the electrical power storage device, wherein the onboard electricity generator is selected from a group comprising: a plurality of solar cells, one or more wind turbines, and one or more hydroelectric generators; wherein the electrical machine acts as an electric motor for driving rotation of the first rotor by using the electrical power storage device, and wherein the electrical machine acts as an electrical power generator for re-charging the electrical power storage device by causing the rotation of the second rotor under action of a wind current;

wherein the plurality of motors includes at least a solar turbine powered impeller motor, the solar turbine powered impeller motor being disposed centrally in the amphibious VTOL unmanned device, the solar turbine powered impeller motor comprising an electric-drive impeller contained in a compression chamber and having an axis of rotation oriented perpendicularly to an axis of the amphibious VTOL unmanned device, the solar turbine powered impeller motor being powered by the plurality of solar cells when the plurality of solar cells is used, the plurality of solar cells comprising at least a solar film, the solar film being integrated on one or more of the following: an upper surface of the amphibious VTOL unmanned device, a lower surface of the amphibious VTOL unmanned device, and the at least one wing of the amphibious VTOL unmanned device; wherein the plurality of solar cells further comprise at least carbon fiber hybrid solar cells;

a Global Positioning System (GPS) module;

a lost model alert;

a cooling device includes one of the group comprising: at least one heat sink, fan, and duct;

a detachable impact absorbing skin or shell;

vision aiding and orientative lights, wherein the vision aiding and orientative lights include light emitting diodes;

a partial vacuum device configured to perform cooling and increase buoyancy;

a manually or automatically deployable parachute;

a lidar; and an ultrasonic radar sensor;

wherein the at least one wing includes a left forward swept wing and a right forward swept wing, the left forward swept wing and the right forward swept wing being mounted on the chassis, and wherein the rotors further include a first brushless ducted fan and a second brushless ducted fan integrated left and right of the chassis, the first brushless ducted fan and the second brushless ducted fan being powered by the solar film, the first brushless ducted fan and the second brushless ducted fan being associated with a brushless electric motor operable to spin the electric-drive impeller to provide at least one air accelerator ring with compressed forced air thrust.

2. The amphibious VTOL unmanned device of claim 1, wherein the rotors include one of the following: ducted rotors, fixed pitch rotors, controllable pitch rotors, two-position rotors, full feathering rotors, and tilted rotors.

3. The amphibious VTOL unmanned device of claim 1, wherein the plurality of motors and the rotors include one or more of the following: two motors and two rotors, three motors and three rotors, four motors and four rotors, five motors and five rotors, and six motors and six rotors.

4. The amphibious VTOL unmanned device of claim 1, wherein at least one of the plurality of motors and the rotors is located on a foldable wing, the foldable wing folding in a ground mode and unfolding in a flight mode.

5. The amphibious VTOL unmanned device of claim 1, further comprising one or more modules attached to the modular and expandable waterproof body, the one or more modules are selected from a group comprising: a waterproof battery module, a turbine, a solar panel, a camera stabilization device, a thermal inspection device, an environmental sample processor, a seismometer, a spectrometer, an osmo-sampler, a night vision device, a hollow waterproof module for upgrades, third-party gear, and hardware upgrades.

6. The amphibious VTOL unmanned device of claim 5, wherein the modular and expandable waterproof body has a back portion and a front portion, wherein the amphibious VTOL unmanned device is configured to be launched from a body of a user, wherein the amphibious VTOL unmanned device is operable to perform an automatic landing and an automatic takeoff, wherein the amphibious VTOL unmanned device is configured in a form of one of the following: a people-carrying vehicle, a cargo-carrying vehicle, a radio controlled toy, an autonomous vehicle, a multi-blade ducted fan roadable electric aircraft, an uncrewed vehicle, a driverless car, a self-driving car, an unmanned aerial vehicle, a drone, a robotic car, a commercial goods and passenger carrying vehicle, and a private self-drive vehicle;

wherein the autonomous vehicle is configured to sense environmental conditions, navigate without human input, and perform autopiloting; wherein the sensing is performed via one or more of the following: the ultrasonic radar sensor, the lidar, the GPS module, and a computer vision module; wherein the environmental sample processor is operable to interpret sensory information to identify navigation paths, obstacles and signage; wherein the autonomous vehicle is operable to update maps based on sensory input to keep track of a position when conditions change or when uncharted environments are entered; and wherein the multi-blade ducted fan roadable electric aircraft is propelled by the plurality of motors using electrical energy stored in the electrical power storage device.

7. The amphibious VTOL unmanned device of claim 1, wherein the battery is partially or completely modular, and wherein the plurality of motors is removable for upgrade, wherein the battery is a lithium ion polymer battery, and wherein the battery includes a built-in battery charge indicator.

8. The amphibious VTOL unmanned device of claim 7, wherein the variable pitch rotors are actuated by servoactuators or one or more of the plurality of motors.

9. The amphibious VTOL unmanned device of claim 1, wherein the propulsion system is powered by:
   a high pressure gas; and
   wherein the plurality of motors comprises direct current brushless motors, wherein the rotors are attached directly to a motor shaft associated with one or more of the plurality of motors or are mechanically linked to one or more of the plurality of motors through a series of pulley belts.

10. The amphibious VTOL unmanned device of claim 9, wherein a position of the pulley belts is set by guide rails, grooved guide pulleys, and cylindrical guide pulleys, and tightened with a tensioner clamp, wherein the pulley belts are configured to connect pulleys on arms with a servo pulley.

11. The amphibious VTOL unmanned device of claim 1, wherein the rotor protection system fully or partially surrounds the rotors.

12. The amphibious VTOL unmanned device of claim 1, wherein the landing system is configured to:
   retract;
   absorb shock;
   conform to a launching surface; and
   house or carry antennas.

13. The amphibious VTOL unmanned device of claim 1, wherein the rotors are foldable or removable, the rotors being attached to arms, and wherein the arms are permanently attached, removable, or foldable.

14. The amphibious VTOL unmanned device of claim 13, wherein the arms are actuated by at least a servomotor drive train connected to the arms.

15. The amphibious VTOL unmanned device of claim 1, wherein the plurality of motors includes one or more of a brushless motor, a brushed motor, an outrunner motor, and an inrunner motor, wherein at least one of the plurality of motors spins with 1800-2400revolutions per volt to be paired with at least one rotor having 4-8 inch diameter and 3-6 inches of pitch per rotation, or spins with 80-700 revolutions per volt to be paired with at least one rotor having 10-18 inch diameter with 4-12 inches of pitch per rotation, and wherein the plurality of motors is non-aligned on at least one axis.

* * * * *